United States Patent
Hutcheson, Jr. et al.

(10) Patent No.: US 11,531,488 B2
(45) Date of Patent: Dec. 20, 2022

(54) COPY-ON-WRITE SYSTEMS AND METHODS

(71) Applicant: DATTO, INC., Norwalk, CT (US)

(72) Inventors: Neale Campbell Hutcheson, Jr., New Canaan, CT (US); Stuart Mark, Chappaqua, NY (US)

(73) Assignee: Kaseya Limited, Dublin (IE)

( * ) Notice: Subject to any disclaimer, the term of this patent is extended or adjusted under 35 U.S.C. 154(b) by 60 days.

(21) Appl. No.: 17/170,094

(22) Filed: Feb. 8, 2021

(65) Prior Publication Data

US 2021/0165575 A1 Jun. 3, 2021

Related U.S. Application Data

(63) Continuation-in-part of application No. 16/391,205, filed on Apr. 22, 2019, now Pat. No. 10,915,407, which is a continuation-in-part of application No. 16/055,347, filed on Aug. 6, 2018, now Pat. No. 10,884,871.

(60) Provisional application No. 62/541,952, filed on Aug. 7, 2017.

(51) Int. Cl.
*G06F 3/06* (2006.01)
*G06F 16/11* (2019.01)

(52) U.S. Cl.
CPC ............ *G06F 3/065* (2013.01); *G06F 3/0604* (2013.01); *G06F 3/067* (2013.01); *G06F 3/0634* (2013.01); *G06F 16/128* (2019.01)

(58) Field of Classification Search
CPC ...... G06F 3/065; G06F 3/0604; G06F 3/0634; G06F 3/067; G06F 16/128
See application file for complete search history.

(56) References Cited

U.S. PATENT DOCUMENTS

| | | | |
|---|---|---|---|
| 6,785,786 B1 | 8/2004 | Gold et al. | |
| 7,093,086 B1 * | 8/2006 | van Rietschote | ... G06F 11/1438 714/13 |
| 7,752,170 B2 | 7/2010 | Boutcher | |
| 7,774,316 B2 | 8/2010 | Breau et al. | |
| 8,200,632 B2 | 6/2012 | Schack et al. | |
| 9,015,430 B2 | 4/2015 | Ranade | |
| 9,176,853 B2 | 11/2015 | Narayanan | |
| 9,690,666 B1 | 6/2017 | Shembavnekar et al. | |
| 10,289,687 B2 | 5/2019 | Adler et al. | |
| 2009/0037680 A1 | 2/2009 | Colbert et al. | |
| 2010/0100696 A1 | 4/2010 | Suzuki | |

(Continued)

FOREIGN PATENT DOCUMENTS

| | | | |
|---|---|---|---|
| WO | 2016205560 A1 | 12/2016 | |
| WO | 2020037985 A1 | 2/2020 | |

OTHER PUBLICATIONS

Acronis International GmbH, "Create A Reliable Backup", 2018, https://www.acronis.com/en-us/personal/computer-backup/.

(Continued)

*Primary Examiner* — William E. Baughman
(74) *Attorney, Agent, or Firm* — Maschoff Brennan

(57) ABSTRACT

Described methods and systems for copying a source volume to a target volume that include a combination of concurrent copying and a copy-on-write (COW) technique that improves the reliability of the backup process and requires fewer resources during a given backup instance than the processes of the prior art.

20 Claims, 11 Drawing Sheets

(56) References Cited

U.S. PATENT DOCUMENTS

| | | | |
|---|---|---|---|
| 2011/0202719 A1* | 8/2011 | Rossi | G06F 11/2082 |
| | | | 707/649 |
| 2011/0258625 A1* | 10/2011 | Waldspurger | G06F 11/1435 |
| | | | 718/1 |
| 2011/0282841 A1 | 11/2011 | Saika et al. | |
| 2012/0011336 A1* | 1/2012 | Saika | G06F 3/0641 |
| | | | 711/E12.103 |
| 2012/0159475 A1 | 6/2012 | Abbondanzio et al. | |
| 2012/0304170 A1 | 11/2012 | Morgan | |
| 2013/0226870 A1 | 8/2013 | Dash | |
| 2013/0262862 A1 | 10/2013 | Hartley | |
| 2014/0098670 A1 | 4/2014 | Raleigh et al. | |
| 2014/0281355 A1 | 9/2014 | Trieu | |
| 2015/0113238 A1* | 4/2015 | Katori | G06F 3/0647 |
| | | | 711/162 |
| 2015/0133239 A1 | 5/2015 | Curtis | |
| 2017/0293628 A1 | 10/2017 | Adler et al. | |
| 2019/0332265 A1* | 10/2019 | Sun | G06F 11/1461 |

OTHER PUBLICATIONS

Gildred, "The Best Image-Based Backup and Cloning Software of 2018", Cloudwards.net, Feb. 22, 2018, https://www.cloudwards.net/best-disk-imaging-software/.

Posey, "Backup Challenges: Protecting Large Volumes of Data", TechTarget, Apr. 2014, https://searchdatabackup.techtarget.com/feature/Backup-challenges-protecting-large-volumes-of-data.

Stender et al., "Loosely Time-Synchronized Snapshots in Object-Based File Systems", 29th IEEE International Performance Computing and Communicating Conference (IPCCC 2010), 2010.

Wu et al., "TotalCOW: Unleash the Power of Copy-On-Write for Thin-provisional Containers", Jul. 27-28, 2015, Tokyo, Japan.

* cited by examiner

COPY-ON-WRITE SYSTEMS AND METHODS

CROSS-REFERENCE TO RELATED APPLICATIONS

This application is a continuation-in-part and claims priority to U.S. patent application Ser. No. 16/391,205, filed on Apr. 22, 2019 and entitled SOURCE VOLUME BACKUP WITH ADAPTIVE FINALIZATION APPARATUSES, METHODS AND SYSTEMS, which is a continuation-in-part of U.S. patent application Ser. No. 16/055,347, filed Aug. 6, 2018 and entitled SYSTEMS AND METHODS FOR COPYING AN OPERATING SOURCE VOLUME, which claims priority to U.S. Provisional Patent Application No. 62/541,952, filed on Aug. 7, 2017, the contents of each of these applications are fully incorporated herein by reference.

BACKGROUND

The following innovations generally relate to systems and methods for copying a source volume to a target volume. It finds particular application in conjunction with advanced methods of performing computer data backups, including a combination of concurrent copying and a copy-on-write (COW) technique that improves the reliability of the backup process and requires fewer resources during a given backup instance than the processes of the prior art.

BRIEF DESCRIPTION

In accordance with a first embodiment of the present disclosure, a method for copying a source volume to a target volume is described. The source volume may be associated with a client device at a client site, and may comprise multiple or a plurality of blocks. The method can comprise the following steps: (a) taking a first snapshot of the source volume, the first snapshot comprising at least one block of the source volume to be copied to the target volume; (b) performing a first backup of the source volume based on at least a used block map; (c) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup; (d) while in incremental tracking mode, causing the operating system to allow writes to the source volume; (e) receiving an instruction to perform an incremental backup of the source volume to the target volume; (f) optionally storing the incremental tracking information in a memory associated with the client device; (g) determining a size of a COW file by multiplying the number of blocks identified by the incremental tracking information by a block size; (h) allocating, via the operating system, space on a storage media associated with the client device for the COW file, wherein the amount of space allocated for the COW file is based on the determined size; (i) initializing, via the operating system, a second incremental tracking data structure; (j) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup; (k) instructing the operating system to begin storing incremental tracking information for any blocks of the source volume modified since creating the snapshot virtual device of the source volume in the second incremental tracking data structure; (l) causing the operating system managing the source volume to enter a copy-on-write mode, wherein for each block of the source volume that is targeted by a write instruction from the operating system, the operating system: (l1) determines whether each targeted block is identified in the incremental tracking information of the first incremental tracking data structure as having been modified since the previous backup; and (l2) if a targeted block is identified in the incremental tracking information of the first incremental tracking data structure as having been modified since the previous backup, copying the contents of the targeted block to the COW file before the write instruction modifies the contents of the targeted block included in the source volume; (m) while the operating system remains in COW mode, performing an incremental backup of the source volume by copying the contents of the snapshot virtual device to the target volume; and (n) causing the operating system to exit COW mode and transition to incremental tracking mode only.

The methods disclosed in accordance with this first embodiment may further comprise: (o) discarding the first incremental tracking data structure; (p) instructing the operating system to continue collecting and storing incremental tracking information in the second incremental tracking data structure; and (q) repeating steps (d) through (p) one or more times.

In accordance with a second embodiment of the present disclosure, another method for copying a source volume to a target volume is disclosed, wherein the source volume is associated with a client device and comprises multiple or a plurality of blocks. These methods can include the following steps: (a) designating a set of one or more blocks to be copied from the source volume to the target volume; (b) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup; (c) while in incremental tracking mode, causing the operating system to allow writes to the source volume; (d) copying the designated set of one or more blocks from the source volume to the target volume while the operating system is configured to write to the source volume; (e) identifying blocks of the source volume that were written to by the operating system since the operating system was configured to collect and store incremental tracking information in step (b); (f) if one or more blocks were identified in step (e), comparing an aggregate size of the identified one or more blocks to a threshold, wherein:
  (f1) if the aggregate size is greater than or equal to the threshold:
    changing the designated set of one or more blocks to be copied from the source volume to the target volume to include only one or more of the identified one or more blocks;
    resetting the incremental tracking information; and
    repeating steps (c), (d), and (e);
  (f2) if the aggregate size is below the threshold:
    causing the operating system to perform an incremental backup of the source volume to the target volume is performed, wherein the operating system managing the source volume enters a copy-on-write mode.

In accordance with this second embodiment, performing an incremental backup of the source volume can comprise the following steps: (g) optionally storing the incremental tracking information in a memory associated with the client device; (h) determining a size of a COW file by multiplying the number of blocks identified by the incremental tracking information by a block size; (i) allocating, via the operating system, space on a storage media associated with the client device for the COW file, wherein the amount of space allocated for the COW file is based on the determined size; (j) initializing, via the operating system, a second incremental tracking data structure; (k) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup; (l) instructing the operating system to begin storing incremental tracking information for any blocks of the source volume modified since creating the snapshot virtual device of the source volume in the second incremental tracking data structure; (m) causing the operating system managing the source volume to enter a copy-on-write mode, wherein for each block of the source volume that is targeted by a write instruction from the operating system, the operating system: (m1) determines whether each targeted block is identified in the incremental tracking information of the first incremental tracking data structure as having been modified since the previous backup; and (m2) if a targeted block is identified in the incremental tracking information of the first incremental tracking data structure as having been modified since the previous backup, copying the contents of the targeted block to the COW file before the write instruction modifies the contents of the targeted block included in the source volume; (n) while the operating system remains in COW mode, performing an incremental backup of the source volume by copying the contents of the snapshot virtual device to the target volume; and (o) causing the operating system to exit COW mode and transition to incremental tracking mode only.

Further, the methods disclosed in accordance with this second embodiment may also include: (p) discarding the first incremental tracking data structure; (q) instructing the operating system to continue collecting and storing incremental tracking information in the second incremental tracking data structure; and (r) repeating steps (c) through (q) one or more times.

Also described herein are systems useful for copying a source volume to a target volume. The systems can include: at least one processor; a memory including instructions that, when executed by the at least one processor, cause the system to perform one or more steps of the methods described herein.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
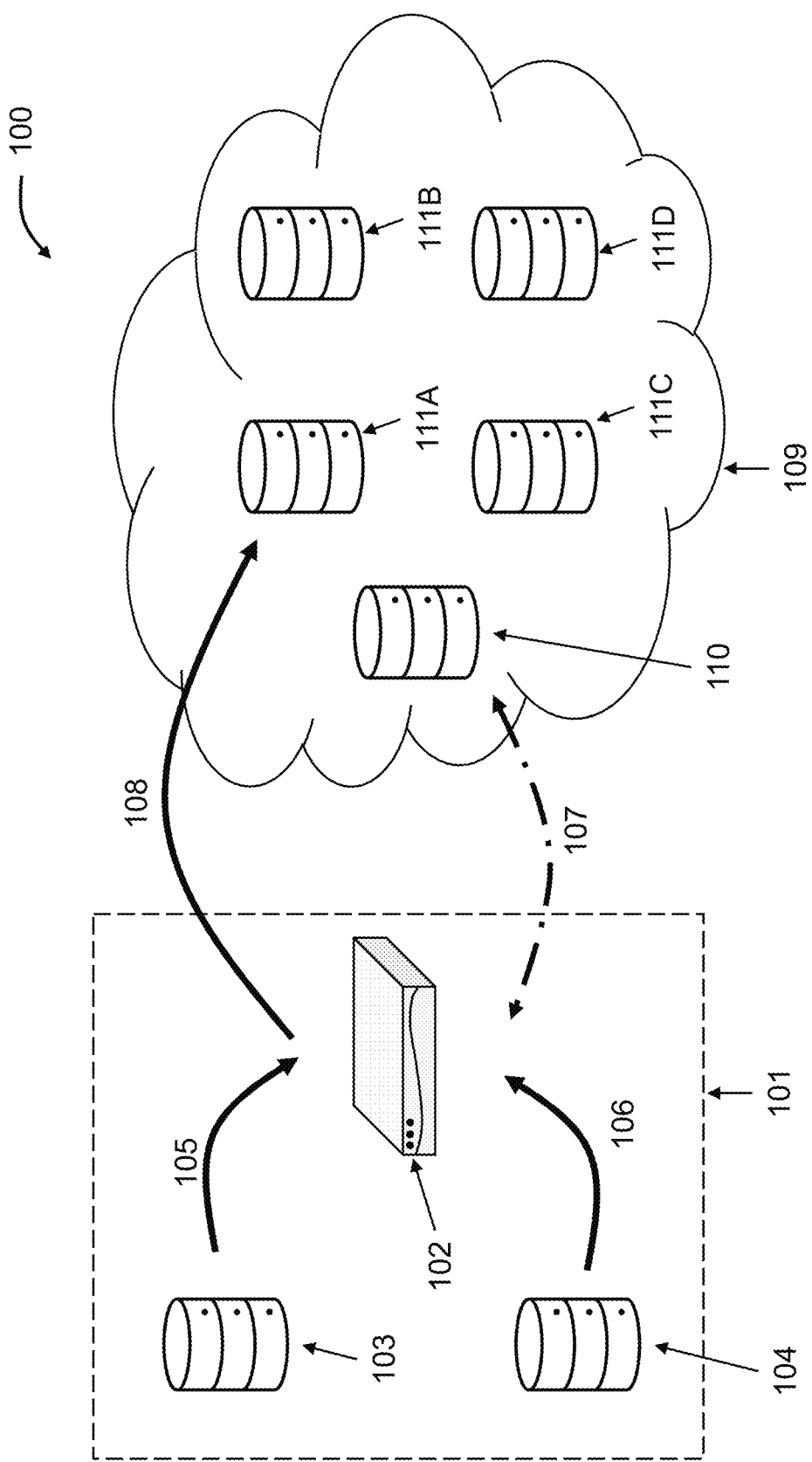
FIG. 1 is a block diagram illustrating the relationship of client sites and backup sites in a backup network in accordance with a first embodiment of the present disclosure.

The present disclosure is directed towards systems and methods for copying a source volume to a target volume. More specifically, systems and methods of performing backups of computer data that include "concurrent copying" of the source volume, an improved copy-on-write (COW) process, or a combination of concurrent copying and COW processes are disclosed. The systems and methods implemented in accordance with the present disclosure improve the reliability of the backup process and generally require fewer resources during a given backup instance than the processes of the prior art.

Client devices, (e.g., servers, workstations, and laptops, and the like) generally comprise one or more computer-readable physical storage devices (e.g., solid-state drives, optical media, magnetic media, and the like), which are partitioned into one or physical volumes by one or more operating systems. A portion of these physical volumes and/or a collection of multiple physical volumes, even across different physical storage devices, may be managed by one or more operating systems as logical volumes. Logical volumes can be written to by one or more operating systems. These logical volumes can also be copied for multiple purposes, such as for backup of critical data or applications, or to make the contents of a source logical volume available at another time or location.

One way to create a copy of a source logical volume that is crash-consistent is to suspend all writes to the source volume while the copying process is ongoing. This can be achieved by instructing an operating system managing the source volume to stop writing to the source volume while the source volume (or a portion thereof) is being copied to a target volume. However, for large volumes, this can impose an undesirable burden on performance since it may take a substantial amount of time to copy the source volume, during which the source volume may be unable to accept new write requests.

Another way to create a copy of a source volume that is crash-consistent is to cause the operating system managing the source volume to enter a copy-on-write (COW) mode before the copying process starts, and to remain in the COW mode until the source volume is completely copied to the target volume. A source volume can be considered to comprise a plurality of "blocks" of storage, wherein each block stores a certain amount of data. When in COW mode, the operating system intercepts every write instruction to the source volume before the write occurs. The operating system then determines—for every write instruction—whether the write would (if allowed to proceed) modify a block of the source volume that has not yet been copied to a target volume. If the to-be-modified block of the source volume has already been copied to the target volume, the operating system can allow the write to proceed (i.e., modify the contents of the block on the source volume). However, if the to-be-modified block has not yet been copied to the target volume, the operating system will first copy the original, unmodified contents of the to-be-modified block to a COW file, thereby preserving the original state of the to-be-modified block. After the original contents of the to-be-modified block have been safely copied to the COW file, the operating system can allow the write instruction to modify the block on the source volume.

Thus, by entering COW mode before the copying process starts, access to the source volume (from the user's perspective) is generally uninterrupted. Then, when the backup process copying the source volume to the target volume attempts to copy a block that has been modified since entering COW mode, the copying process can be re-directed to copy from the portion of the COW file that stores the original contents of the modified block. In this way, the version of the source volume that is copied to the target volume remains crash-consistent because it reflects the state of the source volume at the instant the operating system entered COW mode (i.e., at the beginning of the copying process).

Accordingly, copy-on-write techniques can be used of efficiently create "snapshots" of a source volume by reducing the demand on disk space and I/O bandwidth. As used herein, the term "snapshot" generally refers to a point-in-time capture of a source volume's contents. In other words, every snapshot is associated with a time designation and captures the contents of a source volume "frozen" at that time. To ensure consistency of a backup that represents the contents of a source volume of a client device "frozen" in time, write operations on the client device continue to be performed copy-on-write after the snapshot volume is created and while uploading data from the client (source volume) to the backup location (target volume). All appropriate write operations continue to be copy-on-write until the particular backup instance is completed.

However, a conventional backup process implementing a COW procedure suffer from several drawbacks. First, causing the operating system to enter a COW mode can impact the performance and responsiveness of the operating system and the source volume. Second, requiring the operating system to examine every write instruction to the source volume, and potentially copy blocks of the source volume to the COW file, can tie-up scarce computational resources needed for other operation system processes. Third, COW mode can decrease the perceived speed with which the source volume responds to write instructions. Fourth, if the copying process takes a long time, and if the operating system makes many writes to the source volume during the copying process, a large amount of storage may need to be reserved for the COW file to store the large number of blocks that are modified. Typically, the storage for the COW file must be reserved in advance, even though the operating system cannot predict exactly how long the copying process will take or how many writes will need to be made to the source volume during the copying process. If the space reserved for the COW file is too small to hold all the blocks that were modified during the copying process, the entire copying process may fail. In these cases, it may become impossible to complete the incremental backup associated with the current backup instance, and a different copying process may need to be re-started from the beginning. On the other hand, if the storage reserved for the COW file is too large, fewer resources are available for other data and/or applications. These problems are exacerbated when copying large amounts of data to remote sites via network connections (e.g., via an Internet connection to cloud storage). The various embodiments described herein aim to overcome at least some of these issues by improving the reliability of the backup process and allowing optimal use of resources during a given backup routine.

Turning to FIG. 1, a block diagram illustrating a backup network 100 that capable of utilizing the disclosed systems and methods is shown. In certain embodiments, the backup network 100 may include at least one client site 101 wherein a local device 102 (e.g., a backup aggregator) is responsible for and facilitates the aggregation of image-based backups from a plurality of client devices 103, 104 local to and/or in communication with the backup aggregator 102. For example, a client site 101 may have one or more backup aggregators 102 in communication with one or more client devices 103, 104 on a local area network (LAN). In other embodiments, the client devices 103, 104 and the backup aggregator(s) 102 may be remote, i.e., outside a single LAN or in a different geographical location.

Client devices 103, 104 can be, for example and without limitation, servers, workstations, laptops, and the like, and may periodically transfer (depicted as 105, 106) a representation of a block-level storage device to backup aggregator 102. The backup aggregator 102 may thereafter generate a snapshot of the received image backup file(s) according to a local backup schedule. The snapshot operation may be specific to a particular client device, such as a local backup snapshot policy that generates hourly backups for a mission-critical mail server, while only generating daily snapshots of image backup files from a user's laptop. The backup network 100 may also be configured such that the transfer of image-based backup files from client devices 103, 104 may differ from the local snapshot policy itself.

In certain embodiments, the backup aggregator(s) 102 may maintain such a local backup policy while additionally maintaining a remote backup policy. The remote backup policy may be a backup policy maintained at the backup aggregator 102 that determines how frequently the backup aggregator 102 will synchronize certain image-based backup file snapshot data with a remote cloud storage center 109. In some embodiments, the backup aggregator 102 may coordinate the execution of its remote backup schedule (depicted as 107) with a master server 110. The master server 110 may receive from the backup aggregator 102 an indicator of the backup aggregator's last known storage server pairing within the cloud storage center 109. A storage server, for example server 111A, may be a server that is directly paired with the backup aggregator 102 such that it is capable of receiving and applying to its own snapshot capable file system and receive data representing the file system differences between image-based file backups snap-shotted at two different points in time.

In some embodiments, after coordinating with the master server 110, the backup aggregator 102 may thereafter initiate a send file transfer operation (depicted as 108), with its paired storage server 111A within the cloud storage center 109. In particular embodiments, storage servers 111A-D may itself have a paired or file system mirroring relationship with a second storage server. Such a backup network 100 configuration may be useful in cases where the image-based backup snapshot history maintained on the backup aggregator 102 would be advantageously stored on both the backup aggregator's paired server, e.g., 111A, and a secondary storage server located in a different geographical location. Such a configuration may enable recovery of cloud storage center stored image snapshot data even in scenarios where cloud storage center 109 is partially destroyed.

Further, in some embodiments, the master server 110 may direct the activity of multiple backup aggregators 102 as well as manage or direct the pairing of backup aggregators 102 with different storage server nodes 111A-D within cloud storage center 109. It should be understood that the maintenance of the local or remote backup policy need not necessarily be performed by a backup aggregator device 102. For example, the master server 110 or a storage server 111A-D could instead maintain a backup policy associated with the backup aggregator 102. In such a configuration, the coordination of the backup aggregator 102 with the master server 110 may, for example, additionally comprise sending or receiving information about the currently active local or remote backup policy associated with the backup aggregator 102.

In some embodiments, each client device 103, 104 can comprise a backup agent installed thereon to perform a backup or copying procedure. When the client device 103, 104 runs its backup agent, the backup agent can generate and send periodic backup files to a backup aggregator 102. A periodic backup file may comprise an image-based backup.

As used herein, the terms "image-based backup" and "image backup files" refer to a block-by-block copy of at least a portion of a hard-drive or logical volume. According to some embodiments, the image-based backup is of the allocated portion of a partially allocated hard-drive or logical volume or a portion thereof. According to some embodiments, the image-based backup is of portions of a hard-drive or logical volume that are selected by a user or system operator. According other embodiments, the image-based backup may be of a full hard-drive or logical volume. A block refers to a specific physical area on a hard-drive, or a specific subset of a logical volume, which may contain data. In some embodiments, a block (sometimes called a physical record) can comprise a sequence of bytes or bits, having a specific length called a block size. In this manner, an image-based backup represents the contents of a source hard-drive or logical volume, exactly as this content was stored on the source hard-drive or logical volume at a single point in time. This data can include information associated with an operating system, and data stored in the system along with structural information and application configurations. The source volume used to create the image-based backup file need not actually be a physical hard drive and may, for example, be a logical volume such as a virtual hard disk or even another image-based backup file. The embodiments described herein may be utilized on backup files that are based on a different formatting scheme but otherwise lend themselves to processing by the described embodiments of the backup network.

Once generated, block-level image backup files may serve as the basis for restoring a hard drive or logical volume to a substantially similar state as it existed at the time of the backup, in particular, at the time of entering the COW mode. Image backup files may contain additional data elements such as file system metadata that was present on the source hard drive or logical volume, master boot records, partition information and/or the like. This manner of backup may be distinguished from what may be thought of as a "file/directory level" backup which merely duplicates the contents and location of files and/or directories contained on a hard drive without necessarily including additional metadata, file system data, etc.

Figure 2:
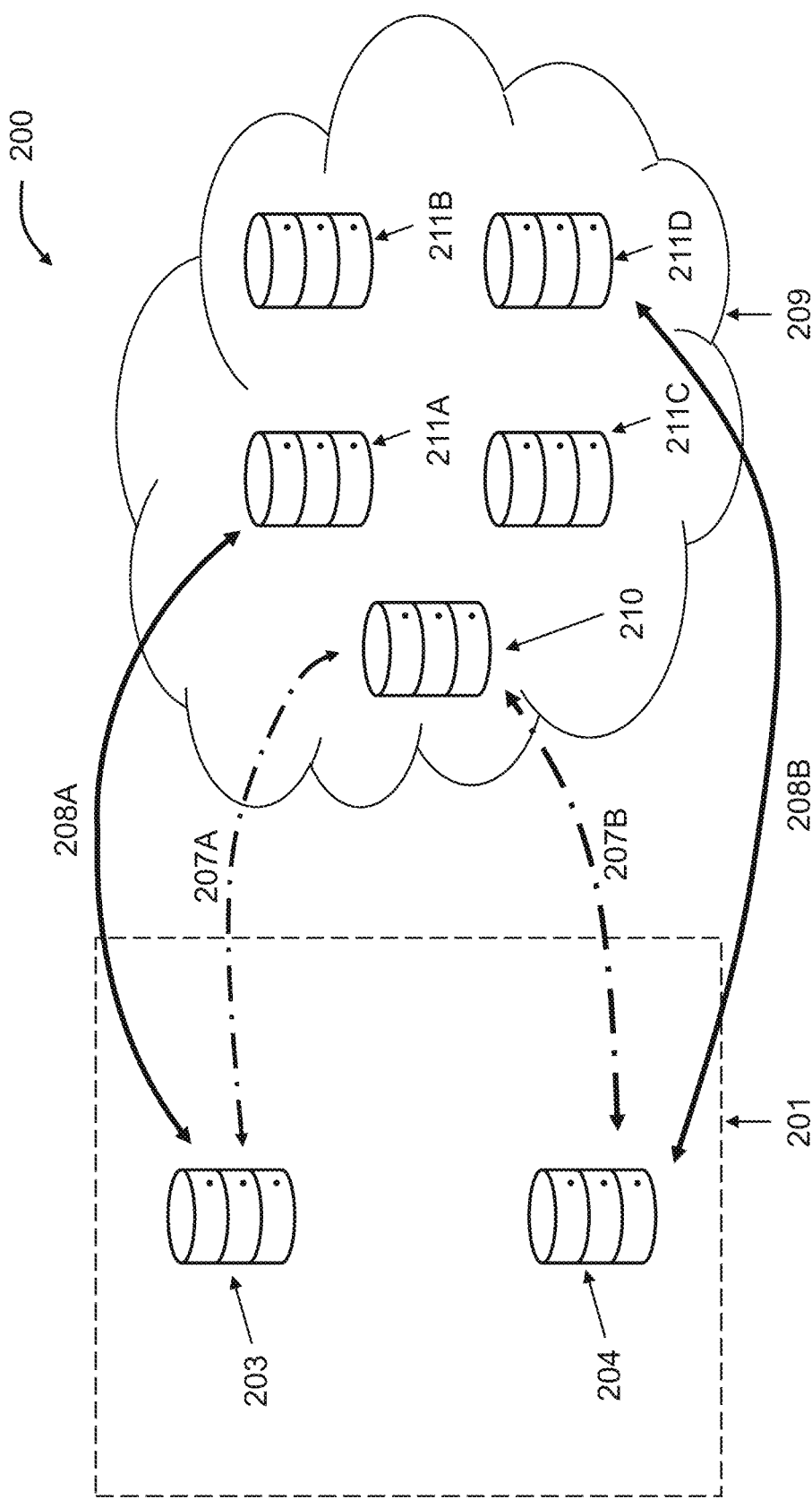
FIG. 2 is a block diagram illustrating the relationship of client sites and backup sites in a backup network in accordance with a second embodiment of the present disclosure.

With reference to FIG. 2, it is also contemplated that the backup network 200 may not include backup aggregators 202 for some or all client sites 201. In such embodiments, client devices 203, 204 instead communicate directly with remote cloud storage center 209. In these embodiments, a backup agent installed on a client device 203, 204 may communicate 207A, 207B with master server 210 in the cloud storage center 209 to coordinate the execution of its remote backup schedule. The master server 210 may receive from the agent on the client device 203, 204 an indicator of the client device's last known storage server pairing within the cloud storage center 209. For instance, the client devices 203, 204 may have been previously paired with storage servers 211A, 211D respectively. After coordinating with master server 210, the backup agent on the client device(s) 203, 204 may thereafter initiate a send file transfer operation, e.g., 208A, 208B, with its paired storage server 211A, 211D within the cloud storage center. Similarly, the backup agent on client device(s) 203, 204 may coordinate the execution of its remote backup schedule with master server 210. If the client device(s) 203, 204 are paired with a storage server (e.g., 211A, 211D), the client device(s) 203, 204 may initiate a send file transfer operation with its paired storage server 211A, 211D. Thus, in certain embodiments, client devices 203, 204 can communicate and transfer image-based backup files directly with cloud storage center 209, without the aid of a backup aggregator local to the client site 201.

The frameworks illustrated in FIG. 1 and FIG. 2 can be scaled across multiple client sites (e.g., 101, 201) of various sizes, i.e., each client site 101, 201 having one or more client devices 103, 104, 203, 204. Further, multiple remote cloud storage centers 109, 209 can be utilized for one or more client sites 101, 201, as desired.

Figure 3:
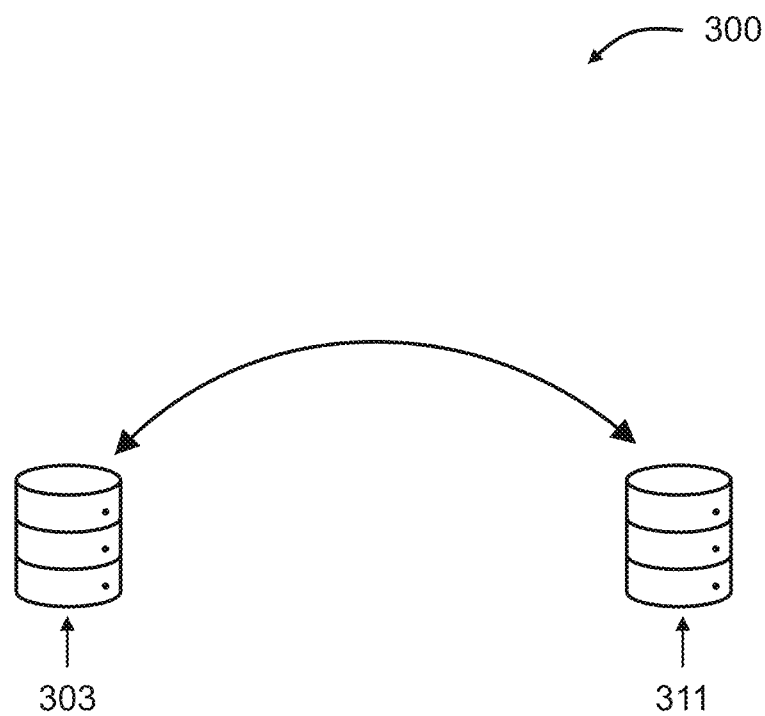
FIG. 3 is a block diagram illustrating a backup system comprising a source volume and a target volume in accordance with various embodiments of the present disclosure.

Turning to FIG. 3, a block diagram illustrating one embodiment of a backup system that utilizes the disclosed systems and methods is shown. In such embodiments, the backup system 300 includes a source volume 303 and a target volume 311. The source volume 303 and the target volume 311 may be on the same device (for example, on the same client computer or computer device, such as two partitions of a single hard drive or on two different hard drives on the same device) or may be on different devices (for example two different server blades or two different servers in the same location or at different locations connected via a communications network).

Figure 4:
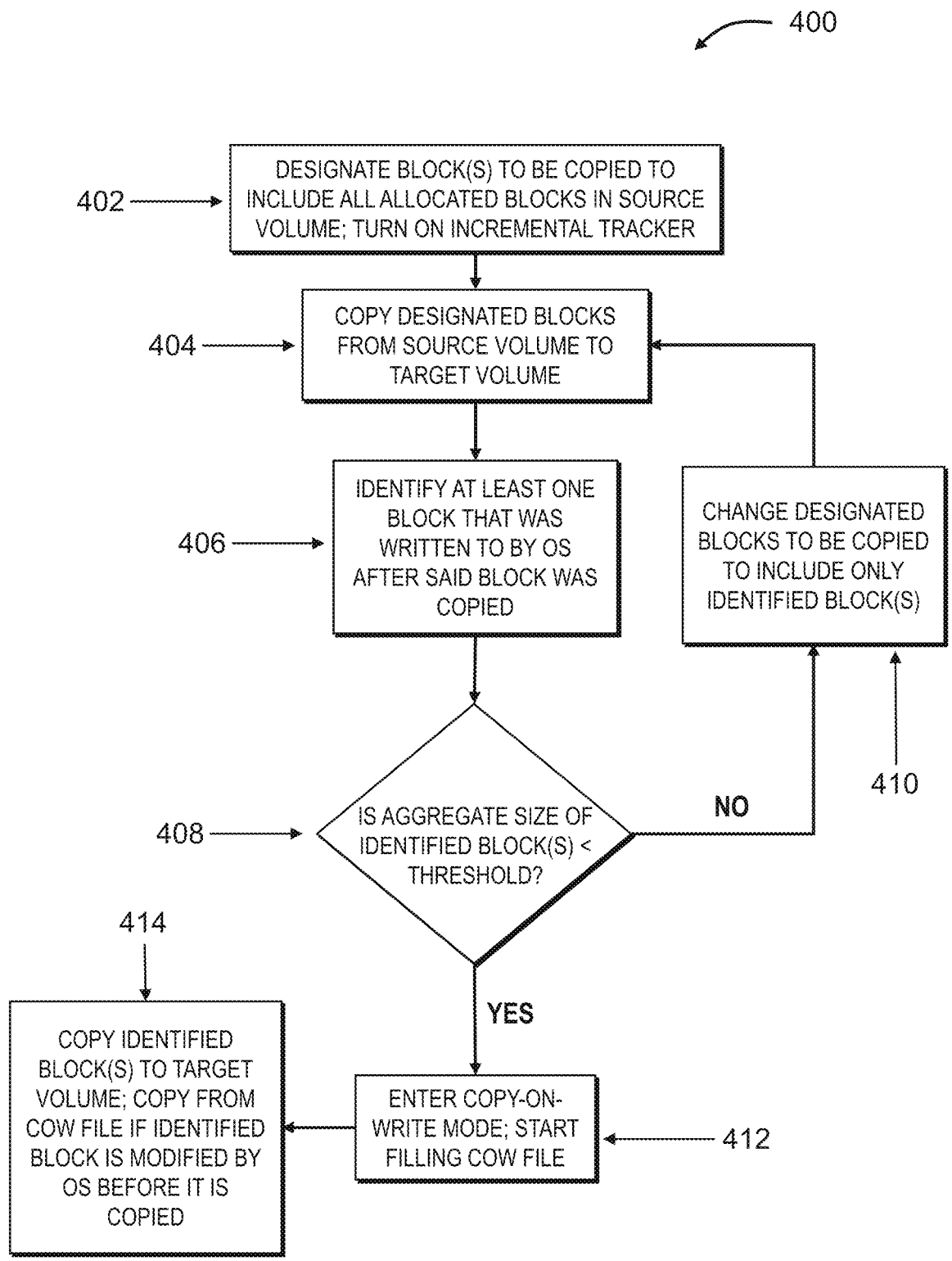
FIG. 4 is a flowchart depicting a backup process for copying a source volume to a target volume in accordance with one aspect of the present disclosure.

Turning now to FIG. 4, a flowchart depicting a "concurrent copy" method 400 for copying a source volume (e.g., 303) to a target volume (e.g., 311) is shown. As discussed above, the source volume may be managed by an operating system that continues to write to the source volume during the copying process 400. In accordance with certain aspects of the present disclosure, the source volume does not need to be taken offline while the copying process is ongoing. In particular embodiments, the process 400 may be used to copy a source volume at a client device (e.g., 103, 104, 203, 204) to a backup aggregator (e.g., 102) in backup network 100. Alternatively, or in addition, process 400 may be used to copy a source volume at a client device (e.g., 103, 104, 203, 204) to a storage server (e.g., 111A-D, 211A-D) in cloud storage center 109, 209.

In some embodiments, process 400 may maintain at least three separate data structures: (i) a list of blocks to be copied from the source volume to the target volume (designated "Blocks_to_Copy" in the discussion below), (ii) a list of blocks that were modified by an operating system (designated "Changed_Blocks" in the discussion below), and (iii) a copy-on-write file (designated "COW_File" in the discussion below). If used, the purpose and operation of each data structure is explained in greater detail below. When process 400 first begins, each data structure Blocks_to_Copy, Changed_Blocks, and COW_File can be initialized to a null value.

At step 402, process 400 designates blocks to be copied. In some embodiments the designated blocks to copy can include all allocated blocks in the source volume. In embodiments that use the data structure Blocks_to_Copy, this can be done by updating Blocks_to_Copy to include a list that identifies all allocated blocks in the source volume. Allocated blocks in the source volume can include blocks that have been identified by a file system on the source volume as containing useful data. In contrast, unallocated blocks may include blocks in the source volume that do not store useful data. In other embodiments, step 402 can also simply designate all blocks in source volume (whether allocated or not) to be copied, which can be done by updating Blocks_to_Copy to include all blocks in the source volume (again, whether allocated or not).

In further embodiments, the designated blocks to be copied may not include all allocated blocks (i.e., may be a subset of the allocated blocks). A set of excluded blocks from particular files may not be copied. For instance, certain files may not be advantageous to a back-up and restore application. Examples of such files include, but are not limited to or required to include, page files, swap files, hibernation files, files within a temp directory, old versions of operating systems, files that have been deleted but are still recoverable. Other files may be excluded as well, depending on the back-up and restore application. Excluding blocks from these files in the copying process can reduce the time to copy and reduce the data storage requirement. In still further embodiments, the designated blocks to copy may be adjusted so that initial passes copy primarily the data blocks that tend to be more stable, while later passes copy the data blocks that tend to change more rapidly.

Also at step 402, process 400 can cause the operating system to enter an incremental tracking mode. While in incremental tracking mode, the operating system can keep track of every write instruction that modifies a block of the source volume. In some embodiments, the incremental tracking mode can also keep track of the time at which each write instruction occurred, and/or the sequence in which the write instructions occurred. Unlike when the operating system is in COW mode, the incremental tracking mode does not attempt to copy to a COW file the contents of blocks that are being written to. Instead, the incremental tracking mode keeps a running list of all blocks in the source volume that have been modified by write instructions since the tracker was turned on. Since the incremental tracking mode does not attempt to copy contents of blocks to a COW file, the incremental tracking mode imposes a relatively small performance burden on the operating system managing the source volume.

At step 404, process 400 copies the designated blocks from the source volume to the target volume. In embodiments that use the data structure Blocks_to_Copy, this step can comprise copying each block in the source volume identified in Blocks_to_Copy to the target volume according to a predetermined sequence, until there are no more blocks left to copy in Blocks_to_Copy. In some embodiments, blocks are identified by a block number, and one example of a predetermined sequence is a numerically ascending order by block number. The predetermined sequence can also be based on physical locations of blocks on a memory device. For example, in some embodiments, each block may correspond to a physical location on a spinning optical or magnetic disk, wherein blocks are numbered according to the order of their physical locations on the disk. Physical storage devices that use spinning disks generally perform best when blocks are read sequentially in increasing numerical block order. Therefore, in some embodiments, the predetermined sequence may be arranged such that sequential or adjacent ranges of blocks are read in order from the block with the smallest block number to the block with the largest block number. Other types of physical storage devices may use solid state memory that uses different channels to read/write data in parallel. For these types of physical storage devices, the predetermined sequence may be arranged such that blocks are read according to a randomly determined sequence. Other types of sequences for reading blocks are also possible. Depending on the size of the source volume (e.g., 303) and the available bandwidth between the source volume (e.g., 303) and the target volume (e.g., 311), step 404 may take a considerable amount of time to complete (e.g., multiple minutes, hours, or even days). After all designated blocks have been copied from the source volume to the target volume, process 400 proceeds to step 406.

At step 406, process 400 identifies at least one block in the source volume that was written to by an operating system after said block was copied to the target volume. This can be done by evaluating records, logs, or data generated and/or modified by the operating system while in incremental tracking mode. For example, during execution of step 404, the incremental tracking mode could have determined whether each write by the operating system to the source volume is to a block of the source volume that has already been copied to the target volume, or has not been copied to the target volume. If the write is to a block of the source volume that has already been copied, the process 400 (while in incremental tracking mode) could add an identifier corresponding to the block of the source volume that was written to by the operating system to a running list of modified blocks. In some simpler embodiments, the incremental tracking mode could forego checking whether a written-to block has been copied to the target volume yet—instead, the mode could simply list all blocks that were written-to during execution of step 404. At step 406, the process of identifying blocks that were written to after said block was copied to the target volume may comprise evaluating the running list of modified blocks maintained by the process 400 while in incremental tracking mode. In embodiments that use the data structure Changed_Blocks, step 406 can comprise updating Changed_Blocks to include a list of each block that was changed after said each block was copied to the target volume. Said another way, Changed_Blocks can be updated to identify each block in the source volume whose corresponding copy in the target volume is now outdated.

In some cases, no blocks may be identified in step 406. This may be because no blocks were written to by the operating system during step 404. Or, alternatively, this may be because some blocks were written to by the operating system during step 404, but all such blocks were modified before they were copied to the target volume (e.g., the target volume already includes the most up-to-date version of the modified blocks). In these cases, process 400 may end at step 406 without proceeding to step 408.

At step 408, process 400 determines whether the aggregate size of all the blocks identified in step 406 is less than a threshold. The threshold may be a fixed aggregate size (e.g., expressed in units of storage such as megabytes, gigabytes, or terabytes), or may be a dynamic size calculated based on an available bandwidth between source volume and target volume, or the size of the source volume or target volume. For instance, the threshold may be calculated by determining the maximum amount of data that may be transferred from the source volume to the target volume within a pre-defined target maximum time, given the available bandwidth between the two volumes, or it may be calculated based on a pre-defined proportion of the total size of at least one of the source volume or target volume. In some embodiments, instead of comparing the aggregate size of the identified blocks against a size threshold, step 408 may compare the number of identified blocks against a numerical threshold (e.g., 500 blocks). If the number and/or aggregate size of all the blocks identified in step 406 is greater than or equal to the threshold, process 400 branches to step 410. If the aggregate size is less than the threshold, process 400 branches to step 412.

If process 400 branches to step 410, this means the aggregate size of all the changed blocks that were identified in step 406 is still relatively large. Process 400 then changes the designated blocks to be copied to include only the blocks identified in step 406. In embodiments that use the data structures Blocks_to_Copy and Changed_Blocks, this step can comprise updating Blocks_to_Copy so that it lists the same data blocks as the Changed_Blocks. Process 400 then branches back to step 404.

When process 400 loops back to step 404, process 400 once again copies the designated blocks from the source volume to the target volume, except this time the blocks that changed during the last copy procedure are copied. According to some embodiments, only the blocks that changed during the last copy procedure are copied. As discussed above, this can comprise copying each data block listed in Blocks_to_Copy to the target volume. In some embodiments, when process 400 loops back to step 404, process 400 once again copies the designated blocks from the source volume to the target volume, except this time only the blocks that changed during the last copy procedure are copied. In copying only the blocks that changed during the last copy procedure (e.g., only the blocks that are identified by Changed_Blocks and Blocks_to_Copy), other blocks that were previously copied to the target volume are not disturbed. Instead, only those blocks in the target volume that are known to be outdated are updated to reflect these blocks' new contents.

After completing step 404, process 400 again branches to step 406, where process 400 once again identifies blocks that were changed during the last copy procedure (e.g., the second time through step 404). In embodiments that use the data structure Changed_Blocks, this can comprise updating Changed_Blocks to include only those data blocks that changed during the last copy procedure (e.g., the second time through step 404). After completing step 406, process 400 once again branches to step 308.

If the rate at which data is being copied from the source volume to the target volume exceeds the rate at which data is being changed in the source volume by the operating system, the number and/or aggregate size of the blocks that are identified in step 406 should generally decrease each time process 400 loops through steps 404, 406, 408, and 410. With each loop, process 400 checks at step 408 whether the aggregate size of the blocks identified in step 406 (e.g., the aggregate size of the blocks listed in Changed_Blocks) is less than the aforementioned threshold. If not, process 400 loops through steps 410, 404 and 406 again. If yes, process 400 exits the loop and branches to step 312.

During steps 402, 404, 406, 408 and 410, the operating system writing to the source volume does not operate in COW mode. However, at step 412, process 400 enters COW mode. As discussed above, in COW mode, the operating system intercepts every write instruction to the source volume before the write occurs. The operating system then determines, for every write, whether the write will modify a block of the source volume that has not yet been copied to the target volume. If the to-be-modified block has already been copied to the target volume, the operating system can allow the write to proceed. If the to-be-modified block has not yet been copied, the operating system can copy the original contents of the to-be-modified block to a "copy-on-write file" or COW_File, thereby preserving the original contents of the block before it is modified by the write. The COW_File is generally not part of the source volume being copied, but is a file stored outside of the source volume. As discussed above, the COW_File can be stored on a separate part of a physical storage device (e.g., hard-drive) that holds all or part of the source volume, or on an entirely separate physical storage device. After the original contents of the to-be-modified block have been safely copied to the COW_File, the operating system can allow the write instruction to modify the block.

At step 414, process 400 copies the identified blocks (e.g., blocks identified the last time through step 406, or the blocks listed in Changed_Blocks) to the target volume. As process 400 copies each identified block in turn, process 400 determines whether each identified block was modified by the operating system since the operating system entered copy-on-write mode. If not, process 400 copies the identified block from the source volume to the target volume. If yes, process 400 copies the original version of the identified block, as preserved in the COW_File, to the target volume. A time associated with the time at which the operating system entered the COW mode can be used as a designation for the time at which the copy is crash consistent. For example, the time designation of the copy can be the hour, minute, second the COW mode was entered, stated to a desired time resolution. According to some embodiments, some function of that entry time could be used for the designation. Such functions include but are not limited to the time of the last write event before the COW process commenced, a fixed time before COW commenced.

By the end of step 414, the target volume contains a crash-consistent copy of the source volume. The copy in the target volume reflects the state of the source volume at the time when process 400 entered copy-on-write mode in step 412, and not the state of the source volume at the time when process 400 began in step 402.

Figure 5A:
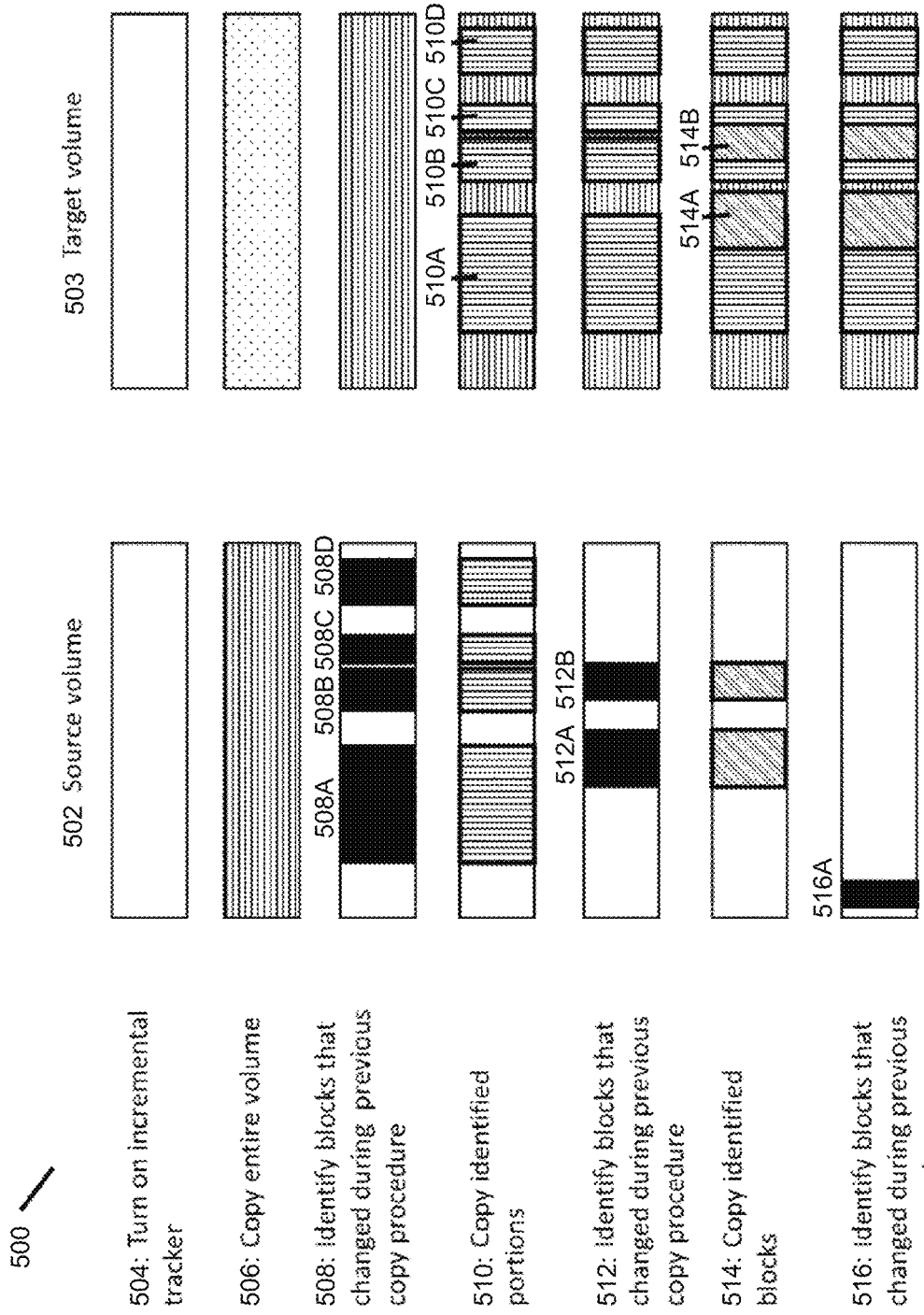
FIGS. 5A and 5B graphical illustration depicting a process for copying a source volume to a target volume in accordance with another aspect of the present disclosure.
Figure 5B:
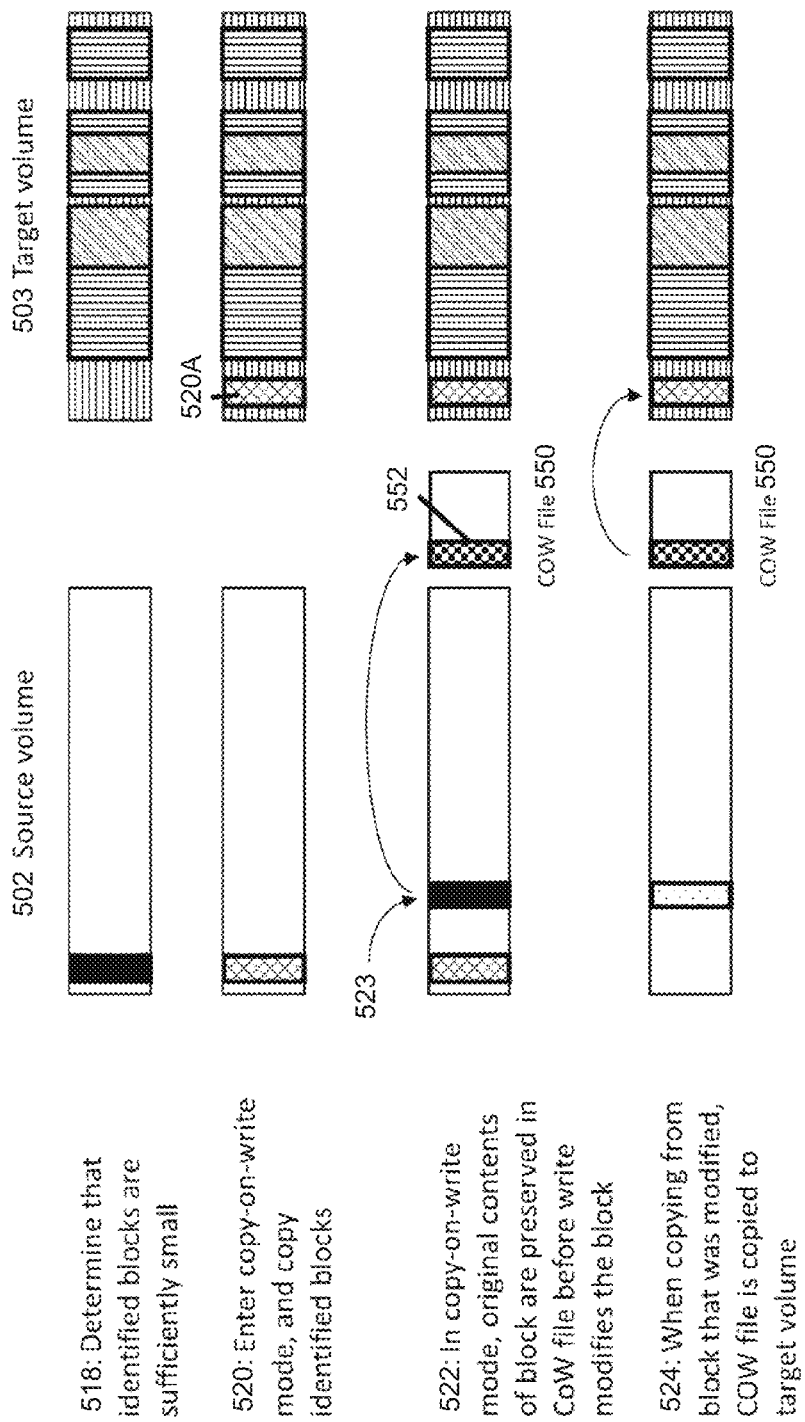

Turning to FIGS. 5A and 5B, the copying of a source volume 502 to a target volume 503 is graphically illustrated in accordance with certain aspects of the present disclosure. As discussed above, source volume 502 may be managed by an operating system (not shown) that continues to make writes to the source volume 502 during the entire copying process. Therefore, there is no need to take source volume offline while the copying process is ongoing.

At step 504, process 500 begins when the operating system managing the source volume 502 enters an incremental tracking mode. As discussed above, the incremental tracking mode keeps track of which blocks have been modified by the operating system, and potentially the time and/or sequence in which these modifications took place.

At step 506, process 500 begins copying every allocated block in the entire source volume 502 to the target volume 503. This process may comprise a software loop that copies each block in the source volume 502 to the target volume 503 according to a predetermined sequence until there are no more blocks in the source volume 502 to be copied. For simplicity of explication, FIG. 5A and the subsequent explanation below assumes that the entire source volume 502 is being copied to the target volume 503 in step 506. However, it should be understood that in some embodiments, only the portion of the source volume that has been allocated by the operating system may be copied in this step; in other embodiments, the entire source volume (whether allocated or not) may be copied. Depending on the size of the source volume 502 and the available bandwidth between source volume 502 and target volume 503, the process of copying the entire source volume 502 to the target volume 503 may take a considerable amount of time (e.g., multiple minutes, hours, or even days).

At step 508, process 500 verifies that the process of copying the entire source volume 502 to the target volume 503 is complete. At this point, the copying process evaluates records, logs, or data generated and/or modified by the operating system while in incremental tracking mode and identifies the blocks that changed during the previous copy procedure, i.e., the copy procedure of step 506. In some embodiments, the identified blocks include each block that was modified by write instructions after said each block had been copied to target volume 503. As illustrated in FIG. 5A, these identified blocks include the blocks at regions 508A, 508B, 508C, and 508D in the source volume.

At step 510, process 500 determines that the aggregate size of the blocks at regions 508A, 508B, 508C, and 508D is greater than or equal to a threshold. Process 400 therefore does not enter copy-on-write mode, but instead proceeds to copy only the blocks identified in step 508 (i.e., 508A, 508B, 508C, and 508D) to the corresponding locations in target volume 503. As a result, the portions 510A, 5108, 510C, and 510D in target volume 503, which correspond to the identified regions 508A, 508B, 508C, and 508D in the source volume 502, are updated to reflect the new state of these identified regions. If the rate at which data is being copied from source volume 502 to target volume 503 exceeds the rate at which data in source volume 502 is being changed by the operating system, the aggregate size of the identified regions 508A, 508B, 508C, and 508D should be smaller than the size of the entire source volume 502. Therefore, the copying process of step 510 will generally take less time than the copying process of step 406.

At step 512, process 500 verifies that the process of copying the blocks identified in step 508 is complete. At this point, the copying process again evaluates the records, logs, or data generated and/or modified by the operating system while in incremental tracking mode and identifies the blocks that changed during the previous copy procedure, i.e., the copy procedure of step 510. In some embodiments, the identified blocks can include each block that was modified by write instructions after said each block had been copied to target volume 503. As illustrated in FIG. 5A, these identified blocks include the blocks at regions 512A and 512B in the source volume.

At step 514, process 500 determines that the aggregate size of the blocks at regions 512A and 512B is greater than or equal to a threshold. Process 500 therefore does not enter COW mode, but instead proceeds to copy only the blocks identified in step 512 (i.e., 512A and 512B) to the corresponding locations in target volume 503. As a result, the portions 514A and 514B in target volume 503, which correspond to the identified regions 512A and 512B, are updated to reflect the new state of these identified regions. If the rate at which data is being copied from source volume 502 to target volume 503 exceeds the rate at which data in source volume 502 is being changed by the operating system, the aggregate size of the identified regions 512A and 512B should be smaller than the aggregate size of the regions 508A, 508B, 508C, and 508D identified in step 508.

At step 516, process 500 verifies that the process of copying the blocks at regions 512A and 512B is complete. At this point, the copying process again evaluates the records, logs, or data generated and/or modified by the operating system while in incremental tracking mode and identifies the blocks that changed during the previous copy procedure, i.e., the copy procedure of step 514. As illustrated in FIG. 5A, these identified blocks include the blocks at region 516A.

Turning to FIG. 5B, at step 518, process 500 determines that the aggregate size of the blocks at region 516A is less than the threshold. As a result, process 500 enters copy-on-write mode in step 520, then begins the process of copying the identified blocks at 516A to the target volume.

The operation of copy-on-write mode is illustrated at step 522. While in copy-on-write mode, the operating system intercepts every write instruction (e.g., write 523) to the source volume before the write occurs. If the write would modify a block in source volume 502 that has not yet been copied to target volume 503, the original contents of the to-be-modified block can first be preserved in COW file 550. For example, a copy of the original contents 552 can be stored in COW file 550.

As illustrated in step 524, when process 500 attempts to copy a block that was modified by the operating system, process 500 can copy the original contents of that block (as preserved in COW file 550) to the target volume. At the end of step 524, the target volume 503 contains a crash-consistent snapshot of source volume 502—this crash-consistent snapshot reflects the state of source volume 502 at the time that the operating system entered copy-on-write mode, in step 520. After the end of step 524, process 500 can optionally exit copy-on-write mode and optionally turn off the incremental tracking mode.

By implementing the systems and methods discussed above, processes 400, 500 can improve the performance of the computer systems in backup networks (e.g., 100, 200) in several ways. First, processes 400, 500 decrease the amount of time that the operating system writing to the source volume (e.g., the operating system of client devices 103, 104) has to stay in copy-on-write mode. By decreasing the amount of time spent in copy-on-write mode, processes 400, 500 decrease the number of COW-related writes to a COW file that the operating system needs to perform, thereby decreasing the performance burden on the operating system. Second, by decreasing the amount of time spent in copy-on-write mode, processes 400, 500 decrease the amount of storage that must be reserved for a COW file. This frees up processing and storage resources for other applications, thereby allowing client devices to perform faster and more efficiently.

However, in situations where the backup takes a significant amount of time and the user(s) are active on a device, significant amounts of copy-on-write data can be produced, thereby consuming valuable system resources and potentially causing the system to run out of space. If the copy-on-write data exceeds the available and/or allocated space, then the backup will fail and the process will have to be restarted. Moreover, because of the nuances of the file system, the COW file has to be pre-allocated before the backup copying starts, which means that the file size of the COW file must be set before the system knows how much data is going to be written while in COW mode.

These drawbacks can arise in systems performing incremental backups, such as disaster recovery system where incremental backups of a client device or client site are performed on a frequent basis (e.g., every few minutes or every hour), to minimize time latency between the last incremental backup and the timepoint of any incident necessitating data recovery. However, by implementing a copy-on-write technique that optimizes the resources used for the COW file in an incremental backup process, these and other drawbacks can be addressed and largely resolved.

Figure 6A:
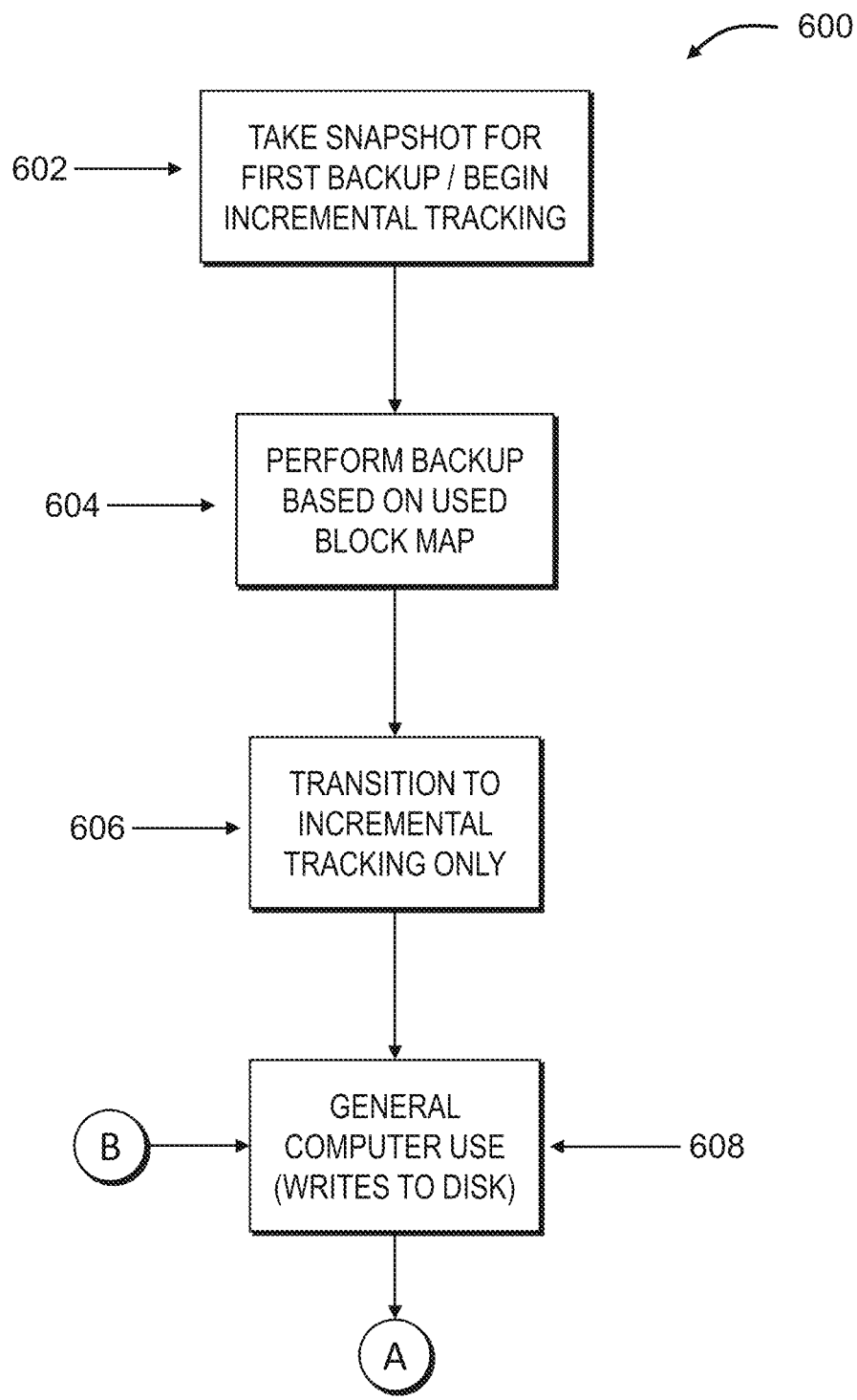
FIGS. 6A and 6B depict a flowchart illustrating a backup process for copying a source volume to a target volume in accordance with a further aspect of the present disclosure.
Figure 6B:
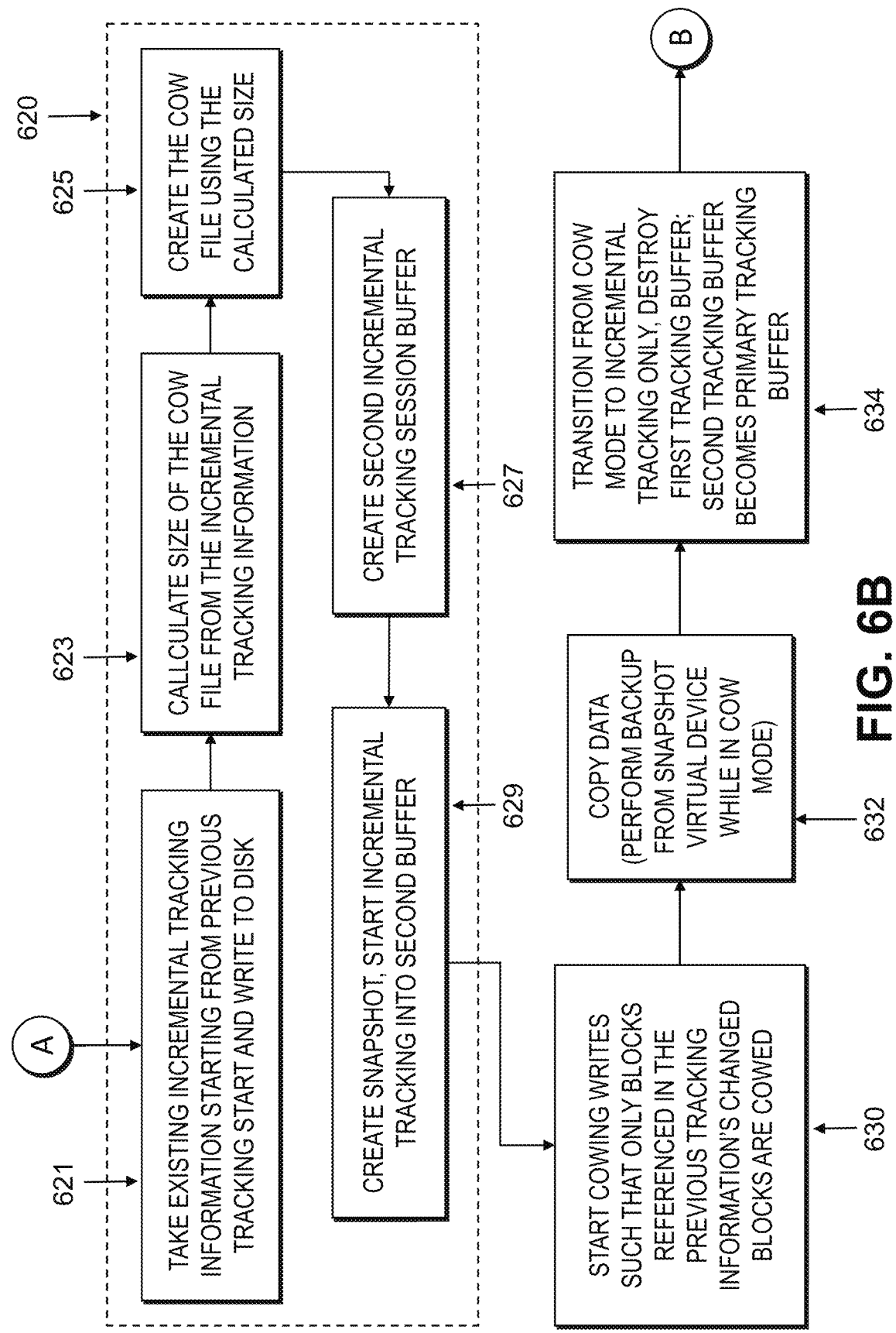

Turning to FIGS. 6A and 6B, a process 600 of backing-up a source volume to a target volume with improved reliability is illustrated in accordance with one aspect of the present disclosure. As illustrated, the process 600 can be performed without the use of a "concurrent copy" routine to obtain an initial backup of the source volume. As used herein, the term "concurrent copying" refers to a method for copying a source volume (or a portion of a source volume) comprising multiple blocks to a target volume while an operating system is configured to write to the source volume.

At step 602, a snapshot of the source volume is created for a first backup routine. As used herein, the term "snapshot" refers to a virtual device/logical volume that is typically stored on the client device (e.g., 103, 104, 203, 204). The snapshot may be a virtual device/logical volume representing enough data of a source volume that, when specific portions are copied to a target volume, the target volume will contain a crash-consistent backup (i.e., image) associated with the point in time that the snapshot was taken. That is, in particular embodiments, the snapshot itself does not represent a crash-consistent image of a source volume or an entire source volume (associated with a particular point in time). Instead, the snapshot represents at least a portion of the source volume associated with a particular point in time, which can be used to create a crash-consistent backup associated with that same point in time. A backup agent on a client device and/or an operating system associated with the client device can be instructed to create a snapshot of the intended data to be backed-up. The snapshot itself does not copy the contents of the source volume, but is a separately addressed representation of the source volume's contents (or a portion of the source volume's contents) at a particular point in time.

Also at step 602, after the snapshot is created, the process 600 begins tracking new changes to the source volume and storing that incremental tracking information in an incremental tracking data structure/buffer. In various embodiments, the incremental tracking information includes a list of blocks that correspond to blocks of the source volume that have been modified since a previous point in time (e.g., since a prior backup instance). The list of blocks of the incremental tracking information is countable, i.e., the number of blocks listed in the incremental tracking information as having been modified since the previous point in time. Thus, the incremental tracking information can include the number of blocks of the source volume modified since performing, for example, a first or a previous backup.

At step 604, an initial backup of the source volume is performed, wherein the source volume (or a portion thereof) is copied to a target volume. This process may be performed in accordance with any one of various embodiments known in the art and is not limited to any particular method.

Once the initial backup is complete, the operating system managing the source volume of the client device can be instructed to transition to an incremental tracking mode only at step 606. At step 608, the process 600 allows the client device to resume general use by an associated user. In other words, after the initial backup is completed in step 604, the operating system managing the source volume switches to only tracking changes made to the source volume (step 606) and begins allowing general use of the client device (step 608), which includes allowing write instructions to be performed that modify the contents of the source volume.

After a period of time has elapsed and the backup system is ready and/or instructed to perform an incremental backup of the source volume (e.g., based on a local or remote backup schedule), the process 600 proceeds to a series of steps 620 as illustrated in FIG. 6B. As used herein, the term "incremental backup" refers to a backup that includes only the blocks that have changed since the start of the previous backup. That is, an incremental backup may capture only the blocks that have changed in the range of time from when the previous backup entered COW mode until the current backup goes into COW mode. In some embodiments, the incremental backup does not copy every block from the source volume. In specific embodiments, the incremental backup does not copy blocks of the source volume that have not changed since the start of the previous backup.

Turning now to FIG. 6B, the remainder of backup process 600 is illustrated, starting with an atomic operation 620. As used herein, the term "atomic operation" refers to a step or series of steps in which the source volume is "locked" and writes to the source volume are generally prohibited until the source volume is released. It is contemplated that the steps of the atomic operation 620 take a minimal amount of time, such as several seconds (e.g., at most five seconds) to several minutes (e.g., less than 30 minutes).

At step 621, the process 600 optionally takes the current incremental tracking information stored in the incremental tracking data structure (e.g., incremental tracking buffer) and writes the current incremental tracking information to disk. In other words, at step 621, the process 600 transfers (i.e., stores) the current incremental tracking information to memory so that the backup system can refer back to the tracking information to determine what blocks need to be backed-up. For example, and without limitation, the current incremental tracking information may originally be stored in RAM memory, and at step 621, may be copied to non-RAM memory such as an optical storage medium, magnetic storage medium, or a solid-state storage medium. In some embodiments, the memory storing the current incremental tracking information may be associated with a client device. In particular embodiments, the incremental tracking data structure may comprise incremental tracking information collected since step 602. In other embodiments, the incremental tracking data structure may comprise incremental tracking information collected since step 629 (discussed below).

At step 623, the operating system and/or a backup agent associated with the client device (e.g., 103, 104, 203, 204) determines how much space to allocate for a COW file prior to the creation of the COW file. That is, the process 600 includes the step 623 of calculating a size of the COW file based on at least the incremental tracking information of the existing/primary incremental tracking data structure. As used herein, the term "primary incremental tracking data structure" refers to the data structure storing the current incremental tracking information, i.e., the incremental tracking information created since the last backup and/or snapshot entered into COW mode.

As discussed above, in situations where the backup takes a significant amount of time and the user(s) are active on a device, significant amounts of copy-on-write data can be produced, thereby consuming valuable system resources and potentially causing the system to run out of space. If the copy-on-write data exceeds the available and/or allocated space, then the backup will fail and an entirely different backup process may need to be implemented (such as a diffmerge or a full backup procedure). While the COW file typically has to be allocated before the backup copying starts (i.e., the file size of the COW file must be set before the system knows how much data is going to be written while in COW mode), the current process 600 enables the system to accurately determine the necessary size of the COW file in advance based on the incremental tracking information of the primary tracking data structure.

In particular embodiments, the size of the COW file that is determined in step 623 involves multiplying the number of blocks identified in the incremental tracking information by the block size. For example, in some embodiments, the incremental tracking information may be stored in a bitmap, and thus the maximum size of the COW file can be calculated by multiplying the number of blocks in the incremental tracking bitmap that are marked as having been written to by the block size represented by a bit in the bitmap.

At step 625, a COW file is created by an operating system by allocating space for the COW file based on the size calculated in step 623. As discussed above, the COW file does not have to be part of the source volume being copied and can be a file stored outside of the source volume. For example, the COW file can be stored on a separate part of a physical storage device (e.g., hard-drive) that holds all or part of the source volume, or on an entirely separate physical storage device.

In some embodiments, the space allocated for the COW file is equal to or approximately equal to the maximum size calculated in step 623. In other embodiments, the space allocated for the COW file is a function of the calculated maximum size of the COW file, but is further based on one or more of: the day (e.g., a day of the week, weekday, weekend, holiday, etc.); the time of day (e.g., during business hours, after business hours, during peak hours only, outside peak hours, etc.); and/or the applications be run (e.g., mission critical applications that need enhanced backup protection are being run, or vice versa when only non-mission critical applications are being utilized). In still further embodiments, it may be desirable to increase or decrease the amount of space allocated for the COW file based on the maximum COW file size calculated. For example, in some embodiments, the allocated space may be increased in order to store additional metadata or decreased to save space. Thus, in certain embodiments, the allocated space for the COW file may be based on a percentage of the maximum COW file size calculated based on the incremental tracking information, such as from about 80% to about 90%, or from about 90% to 95%, or from about 95% to about 99%, or from about 99% to about 100%, or from about 100% to about 110%, or from about 110% to about 120%, or from about 120% to about 130%, or from about 130% to about 140%, or from about 140% to about 150%, or any combination of endpoints thereof, based on the maximum calculated COW file size.

At step 627, a second incremental tracking session data structure (i.e., buffer) is initialized separately from the primary incremental tracking data structure. The second incremental tracking data structure will be used to continue tracking changes to the source volume while the process 600 uses the previous incremental tracking information in the first/primary incremental tracking data structure to fill the COW file and perform a backup from the snapshot of the source volume. The incremental tracking information stored in the second incremental tracking data structure will also be used to calculate the optimal COW file size for the next backup.

At step 629, a snapshot (e.g., a virtual device) of the source volume (or a portion thereof) is created based on the incremental tracking information of the primary incremental tracking data structure, the COW file, and the source volume to the extent that certain blocks of the source volume have not been changed since the previous snapshot. Additionally, at step 629, after the snapshot is created, the operating system managing the source volume and/or a backup agent associated with the client device continues tracking incremental changes to the source volume but begins storing that incremental tracking information in the second incremental tracking data structure. Once the snapshot is created and the second incremental tracking data structure is ready to begin storing new incremental changes, the "lock" imposed on the source volume during the atomic operation 620 is released, and the system can allow writes to the source volume again. That is, after the snapshot is created in step 629, any modifications to the source volume (i.e., writes that change blocks on the source volume) are no longer stored in the primary incremental tracking data structure, but are instead stored in the secondary incremental tracking data structure.

Continuing onto step 630, the operating system managing the source volume transitions into COW mode. As discussed above, when in COW mode, the operating system intercepts every write instruction to the source volume before the write occurs. The operating system then determines, for every write, whether the write would (if allowed to proceed) modify a block of the source volume that has not yet been copied to the target volume. If the to-be-modified block has already been copied to the target volume, the operating system can allow the write to proceed. If the to-be-modified block has not yet been copied to the target volume, the operating system can copy the original, un-modified contents of the to-be-modified block to the COW file, thereby preserving the original state of the to-be-modified block. After the original contents of the to-be-modified block have been safely copied to the COW file, the operating system can then allow the write instruction to modify the block.

Thus, the COW file that forms part of the snapshot volume (initialized in step 629) is filled with changed blocks (and only the changed blocks) based on the incremental tracking information stored in the primary incremental tracking data structure, rather than performing a copy-on-write operation for every write instruction regardless of the incremental tracking information. In other words, the only writes that are copied-on-write to the COW file are ones that the system needs to read into a target backup volume (i.e., the writes which modify blocks of the source volume that the incremental tracking information indicates have changed since the last backup). In this manner, the snapshot volume created in step 629 becomes a representation of the state of the source volume at a specific point in time. More specifically, the snapshot created in step 629 becomes a representation of the state of the source volume (or the state of a portion of the source volume) immediately prior to the atomic operation 620.

At step 632, while still in COW mode and while the operating system managing the source volume is still performing incremental tracking (with tracking information being stored in the secondary incremental tracking data structure), the operating system and/or the backup agent associated with the client device then copies the data off of the snapshot virtual device that was created in step 629 to a target volume. In particular embodiments, the target volume may be on the same device as the source volume (for example, on the same client computer or computer device, such as two partitions of a single hard drive or on two different hard drives on the same device) or may be on a different device (for example two different server blades or two different servers in the same location or at different locations connected via a communications network). By the end of step 632, the target volume contains a crash-consistent incremental copy of the source volume (or a portion thereof).

Once the backup from the snapshot virtual device is completed in step 632, the operating system exits COW mode and transitions into an incremental tracking only mode in step 634. In this mode, the operating system managing the source volume continues to store incremental tracking information associated with the source volume in the second incremental tracking data structure. Additionally, the incremental tracking information stored in the primary incremental tracking data structure is no longer needed because the necessary data has been backed-up. Therefore, in step 634, the previous incremental tracking information can be discarded. Then, the secondary incremental tracking data structure that has been storing incremental tracking information since step 629 becomes the primary tracking data structure/buffer for the purposes of the next backup process 600.

After step 634, the incremental backup process 600 may repeat by returning to allowing general computer use (e.g., step 608) and looping through steps 608, 621, 623, 625, 627, 629, 630, 632, and 634, as illustrated in FIGS. 6A and 6B.

Because the system knows ahead of time exactly which blocks are going to need to be read from during each pass through the incremental backup process (i.e., by virtue of the incremental tracking data), the backup system can calculate the optimal size of the COW file in advance based on the maximum number of blocks that can possibly need to be read while in COW mode. Thus, the process 600 allows the accurate determination of the maximum COW space (i.e., file size) required for a particular incremental backup and the minimum the number of writes needed to fill the COW file during the backup. By accurately determining the amount of space that is needed for a particular backup instance in accordance with the present disclosure, the risk of a copying procedure failing can be reduced and/or eliminated.

Figure 7A:
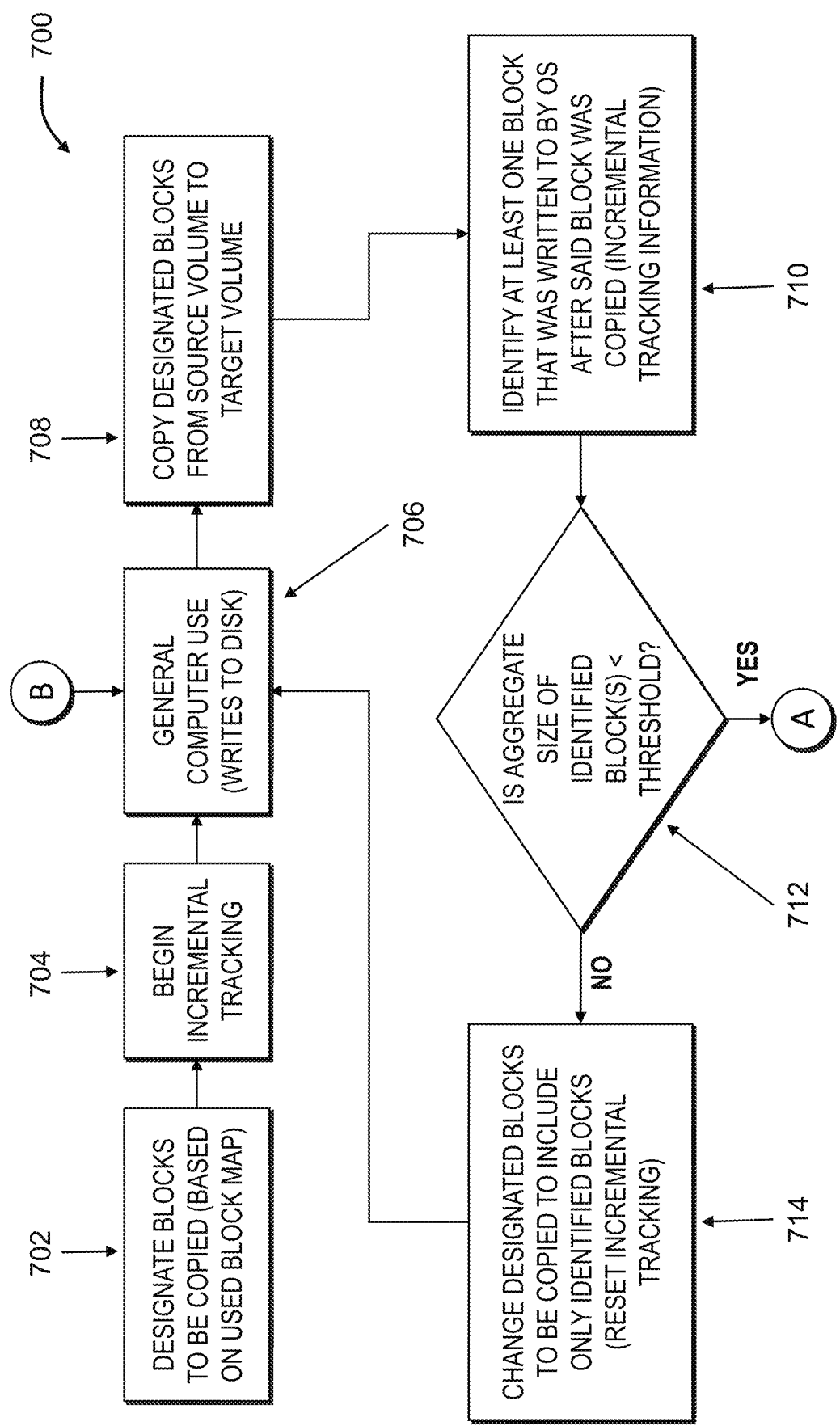
FIGS. 7A and 7B depict a flowchart illustrating a backup process for copying a source volume to a target volume in accordance with still another aspect of the present disclosure.
Figure 7B:
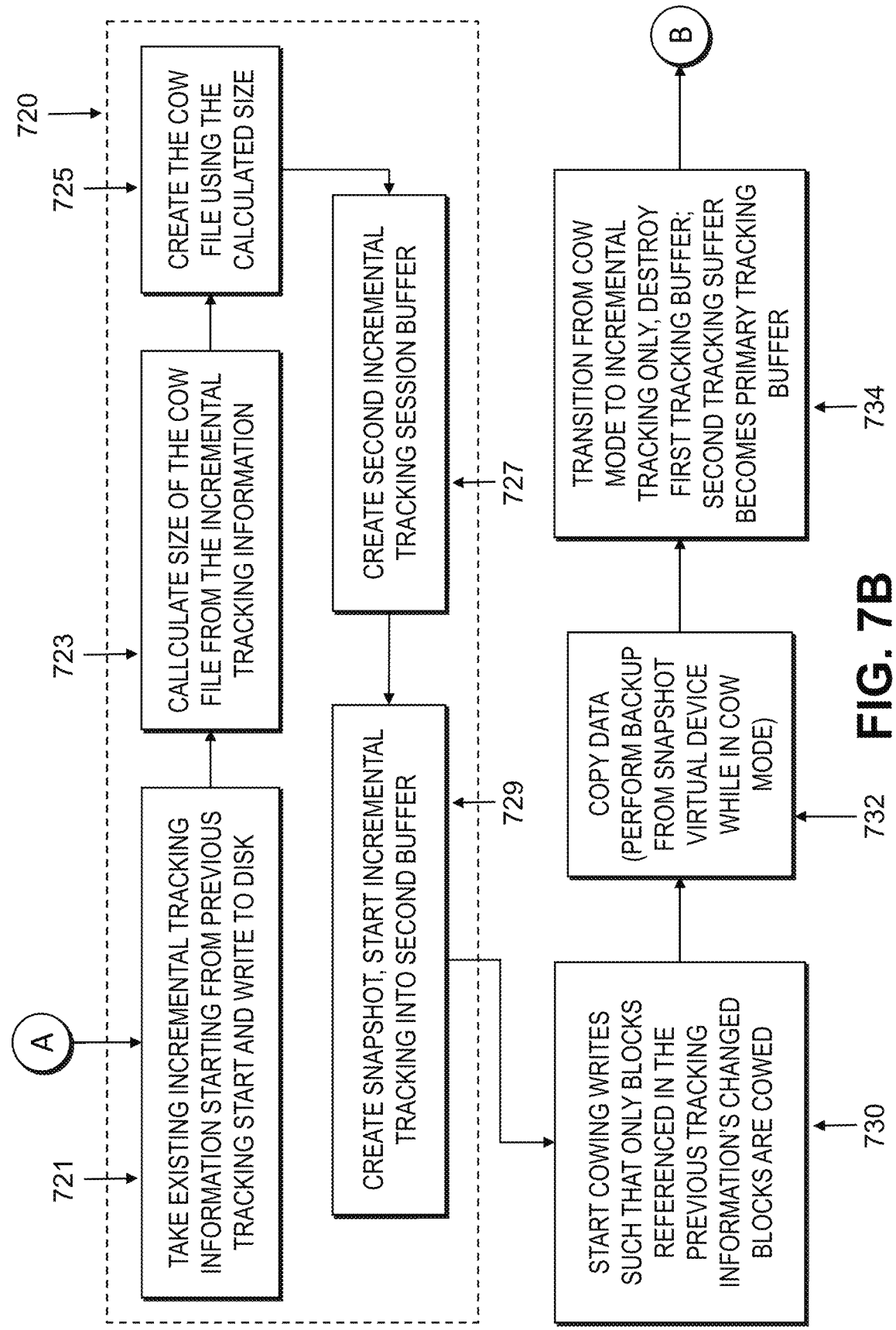

With reference to FIGS. 7A and 7B, also disclosed herein are methods 700 implementing a combination of performing an initial backup using a "concurrent copy" routine and incremental backups using incremental tracking information to allocate COW file sizes. As illustrated in FIG. 7A, a source volume (e.g., 303) can initially be copied to a target volume (e.g., 311) using a "concurrent copy" method (e.g., without entering copy-on-write mode). As discussed above, the process 700 may be used to copy a source volume at a client device (e.g., 103, 104, 203, 204) to a backup aggregator (e.g., 102) in backup network 100. Alternatively, or in addition, process 700 may be used to copy a source volume at a client device (e.g., 103, 104, 203, 204) to a storage server (e.g., 111A-D, 211A-D) in cloud storage center 109, 209.

In some embodiments, process 700 may maintain at least three separate data structures: (i) a list of blocks to be copied from the source volume to the target volume (designated "Blocks_to_Copy" in the discussion below), (ii) a list of blocks that were modified by an operating system (designated "Changed_Blocks" in the discussion below), and (iii) a copy-on-write file (designated "COW_File" in the discussion below). If used, the purpose and operation of each data structure is explained in greater detail below. When process 700 first begins, each data structure Blocks_to_Copy, Changed_Blocks, and COW_File can be initialized to a null value.

At step 702, process 700 designates blocks to be copied. In some embodiments the designated blocks to copy can include all allocated blocks in the source volume. In embodiments that use the data structure Blocks_to_Copy, this can be done by updating Blocks_to_Copy to include a list that identifies all allocated blocks in the source volume. Allocated blocks in the source volume can include blocks that have been identified by a file system on the source volume as containing useful data. In contrast, unallocated blocks may include blocks in the source volume that do not store useful data. In other embodiments, step 702 can also simply designate all blocks in source volume (whether allocated or not) to be copied, which can be done by updating Blocks_to_Copy to include all blocks in the source volume (again, whether allocated or not).

In further embodiments, the designated blocks to be copied may not include all allocated blocks (i.e., may be a subset of the allocated blocks). A set of excluded blocks from particular files may not be copied. For instance, certain files may not be advantageous to a back-up and restore application. Examples of such files include, but are not limited to or required to include, page files, swap files, hibernation files, files within a temp directory, old versions of operating systems, files that have been deleted but are still recoverable. Other files may be excluded as well, depending on the back-up and restore application. Excluding blocks from these files in the copying process can reduce the time to copy and reduce the data storage requirement. In still further embodiments, the designated blocks to copy may be adjusted so that initial passes copy primarily the data blocks that tend to be more stable, while later passes copy the data blocks that tend to change more rapidly.

At step 704, process 700 can cause the operating system to enter an incremental tracking mode. While in incremental tracking mode, the operating system can keep track of every write instruction that modifies a block of the source volume. In some embodiments, the incremental tracking mode can also keep track of the time at which each write instruction occurred, and/or the sequence in which the write instructions occurred. Unlike when the operating system is in COW mode, the incremental tracking mode does not attempt to copy to a COW file the contents of blocks that are being written to. Instead, the incremental tracking mode keeps a running list of all blocks in the source volume that have been modified by write instructions since the tracker was turned on. Since the incremental tracking mode does not attempt to copy contents of blocks to a COW file, the incremental tracking mode imposes a relatively small performance burden on the operating system managing the source volume.

At step 706, the process 700 allows the client device to resume general use by an associated user. In other words, prior to performing an initial backup, the operating system managing the source volume switches to only tracking changes made to the source volume (step 704) and begins allowing general use of the client device (step 706), which includes allowing write instructions to be performed that modify the contents of the source volume.

At step 708, process 700 copies the designated blocks from the source volume to the target volume. In embodiments that use the data structure Blocks_to_Copy, this step can comprise copying each block in the source volume identified in Blocks_to_Copy to the target volume according to a predetermined sequence, until there are no more blocks left to copy in Blocks_to_Copy. In some embodiments, blocks are identified by a block number, and one example of a predetermined sequence is a numerically ascending order by block number. The predetermined sequence can also be based on physical locations of blocks on a memory device. For example, in some embodiments, each block may correspond to a physical location on a spinning optical or magnetic disk, wherein blocks are numbered according to the order of their physical locations on the disk. Physical storage devices that use spinning disks generally perform best when blocks are read sequentially in increasing numerical block order. Therefore, in some embodiments, the predetermined sequence may be arranged such that sequential or adjacent ranges of blocks are read in order from the block with the smallest block number to the block with the largest block number. Other types of physical storage devices may use solid state memory that uses different channels to read/write data in parallel. For these types of physical storage devices, the predetermined sequence may be arranged such that blocks are read according to a randomly determined sequence. Other types of sequences for reading blocks are also possible. Depending on the size of the source volume (e.g., 303) and the available bandwidth between the source volume (e.g., 303) and the target volume (e.g., 311), step 708 may take a considerable amount of time to complete (e.g., multiple minutes, hours, or even days). After all designated blocks have been copied from the source volume to the target volume, process 700 proceeds to step 706.

At step 710, process 700 identifies at least one block in the source volume that was written to by an operating system after said block was copied to the target volume. This can be done by evaluating records, logs, or data generated and/or modified by the operating system while in incremental tracking mode. For example, during execution of step 708, the incremental tracking mode could have determined whether each write by the operating system to the source volume is to a block of the source volume that has already been copied to the target volume, or has not been copied to the target volume. If the write is to a block of the source volume that has already been copied, the process 700 (while in incremental tracking mode) could add an identifier corresponding to the block of the source volume that was written to by the operating system to a running list of modified blocks. In some simpler embodiments, the incremental tracking mode could forego checking whether a written-to block has been copied to the target volume yet—instead, the mode could simply list all blocks that were written-to during execution of step 708. At step 710, the process of identifying blocks that were written to after said block was copied to the target volume may comprise evaluating the running list of modified blocks maintained by the process 700 while in incremental tracking mode. In embodiments that use the data structure Changed_Blocks, step 710 can comprise updating Changed_Blocks to include a list of each block that was changed after said each block was copied to the target volume. Said another way, Changed_Blocks can be updated to identify each block in the source volume whose corresponding copy in the target volume is now outdated.

In some cases, no blocks may be identified in step 710. This may be because no blocks were written to by the operating system during step 708. Or, alternatively, this may be because some blocks were written to by the operating system during step 708, but all such blocks were modified before they were copied to the target volume (e.g., the target volume already includes the most up-to-date version of the modified blocks). In these cases, process 700 may end at step 710 without proceeding to step 712 or may proceed to step 721 (shown in FIG. 7B).

At step 712, process 700 determines whether the aggregate size of all the blocks identified in step 710 is less than a threshold. The threshold may be a fixed aggregate size (e.g., expressed in units of storage such as megabytes, gigabytes, or terabytes), or may be a dynamic size calculated based on an available bandwidth between source volume and target volume, or the size of the source volume or target volume. For instance, the threshold may be calculated by determining the maximum amount of data that may be transferred from the source volume to the target volume within a pre-defined target maximum time, given the available bandwidth between the two volumes, or it may be calculated based on a pre-defined proportion of the total size of at least one of the source volume or target volume. In some embodiments, instead of comparing the aggregate size of the identified blocks against a size threshold, step 712 may compare the number of identified blocks against a numerical threshold (e.g., 500 blocks). If the number and/or aggregate size of all the blocks identified in step 710 is greater than or equal to the threshold, process 700 branches to step 714. If the aggregate size is less than the threshold, process 700 branches to step 721.

If process 700 branches to step 714, this means the aggregate size of all the changed blocks that were identified in step 710 is still relatively large. Process 700 then changes the designated blocks to be copied to include only the blocks identified in step 710. In embodiments that use the data structures Blocks_to_Copy and Changed_Blocks, this step can comprise updating Blocks_to_Copy so that it lists the same data blocks as the Changed_Blocks. Process 700 then branches back to step 706.

When process 700 loops back to step 706, process 700 once again allows general computer use (writes to disk), but resets the incremental tracking information stored in the incremental tracking data structure and then proceeds to copy the designated blocks from the source volume to the target volume, except this time the blocks that changed during the last copy procedure are copied (i.e., identified in the incremental tracking information). According to some embodiments, only the blocks that changed during the last copy procedure are copied. As discussed above, this can comprise copying each data block listed in Blocks_to_Copy to the target volume. In copying only the blocks that changed during the last copy procedure (e.g., only the blocks that are identified by Changed_Blocks and Blocks_to_Copy), other blocks that were previously copied to the target volume are not disturbed. Instead, only those blocks in the target volume that are known to be outdated are updated to reflect these blocks' new contents.

After completing step 708, process 700 again branches to step 710, where process 700 once again identifies blocks that were changed during the last copy procedure (e.g., the second time through step 706). In embodiments that use the data structure Changed_Blocks, this can comprise updating Changed_Blocks to include only those data blocks that changed during the last copy procedure (e.g., the second time through step 706). After completing step 710, process 700 once again branches to step 712.

If the rate at which data is being copied from the source volume to the target volume exceeds the rate at which data is being changed in the source volume by the operating system, the number and/or aggregate size of the blocks that are identified in step 710 should generally decrease each time process 700 loops through steps 706, 708, 710, and 712. With each loop, process 700 checks at step 712 whether the aggregate size of the blocks identified in step 710 (e.g., the aggregate size of the blocks listed in Changed_Blocks) is less than the aforementioned threshold. If not, process 700 loops through steps 706, 708 and 710 again. If yes, process 700 exits the loop and branches to step 721. Notably, in step 706 through step 714, the operating system writing to the source volume does not operate in COW mode.

Turning now to FIG. 7B, the remainder of backup process 700 is illustrated, starting with an atomic operation 720. At step 721, the process 700 optionally takes the current incremental tracking information stored in the incremental tracking data structure (e.g., incremental tracking buffer) and writes the current incremental tracking information to disk. In other words, at step 721, the process 700 transfers (i.e., stores) the current incremental tracking information to memory so that the backup system can refer back to the tracking information to determine what blocks need to be backed-up. For example, and without limitation, the current incremental tracking information may originally be stored in RAM memory, and at step 721, may be copied to non-RAM memory such as an optical storage medium or a solid-state storage medium. In some embodiments, the memory storing the current incremental tracking information may be associated with a client device. In particular embodiments, the incremental tracking data structure may comprise incremental tracking information collected since step 704. In other embodiments, the incremental tracking data structure may comprise incremental tracking information collected since step 729 (discussed below).

At step 723, the operating system and/or a backup agent associated with the client device (e.g., 103, 104, 203, 204) determines how much space to allocate for a COW file prior to the creation of the COW file. That is, the process 700 includes the step 723 of calculating a size of the COW file based on at least the incremental tracking information of the existing/primary incremental tracking data structure. As used herein, the term "primary incremental tracking data structure" refers to the data structure storing the current incremental tracking information, i.e., the incremental tracking information created since the last backup and/or snapshot.

As discussed above, in situations where the backup takes a significant amount of time and the user(s) are active on a device, significant amounts of copy-on-write data can be produced, thereby consuming valuable system resources and potentially causing the system to run out of space. If the copy-on-write data exceeds the available and/or allocated space, then the backup will fail and the process (e.g., process 700) will have to be restarted. While the COW file typically has to be allocated before the backup copying starts (i.e., the file size of the COW file must be set before the system knows how much data is going to be written while in COW mode), the current process 700 enables the system to accurately determine the necessary size of the COW file in advance based on the incremental tracking information of the primary tracking data structure.

In particular embodiments, the size of the COW file that is determined in step 723 involves multiplying the number of blocks identified in the incremental tracking information by the block size. For example, in some embodiments, the incremental tracking information may be stored in a bitmap, and thus the maximum size of the COW file can be calculated by multiplying the number of blocks in the incremental tracking bitmap that are marked as having been written to by the block size represented by a bit in the bitmap.

At step 725, a COW file is created by an operating system by allocating space for the COW file based on the size calculated in step 723. As discussed above, the COW file does not have to be part of the source volume being copied and can be a file stored outside of the source volume. For example, the COW file can be stored on a separate part of a physical storage device (e.g., hard-drive) that holds all or part of the source volume, or on an entirely separate physical storage device.

In some embodiments, the space allocated for the COW file is equal to or approximately equal to the maximum size calculated in step 723. In other embodiments, the space allocated for the COW file is a function of the calculated maximum size of the COW file, but is further based on one or more of: the day (e.g., a day of the week, weekday, weekend, holiday, etc.); the time of day (e.g., during business hours, after business hours, during peak hours only, outside peak hours, etc.); and/or the applications be run (e.g., mission critical applications that need enhanced backup protection are being run, or vice versa when only non-mission critical applications are being utilized). In still further embodiments, it may be desirable to increase or decrease the amount of space allocated for the COW file based on the maximum COW file size calculated. For example, in some embodiments, the allocated space may be increased in order to store additional metadata or decreased to save space. Thus, in certain embodiments, the allocated space for the COW file may be based on a percentage of the maximum COW file size calculated based on the incremental tracking information, such as from about 80% to about 90%, or from about 90% to 95%, or from about 95% to about 99%, or from about 99% to about 100%, or from 100% to about 110%, or from about 110% to about 120%, or from about 120% to about 130%, or from about 130% to about 140%, or from about 140% to about 150%, or any combination of endpoints thereof, based on the maximum calculated COW file size.

At step 727, a second incremental tracking session data structure (i.e., buffer) is initialized separately from the primary incremental tracking data structure. The second incremental tracking data structure will be used to continue tracking changes to the source volume while the process 700 uses the previous incremental tracking information in the first/primary incremental tracking data structure to fill the COW file and perform a backup from the snapshot of the source volume.

At step 729, a snapshot (e.g., a virtual device) of the source volume is created based on the incremental tracking information of the primary incremental tracking data structure, the COW file, and the source volume to the extent that certain blocks of the source volume have not been changed since the previous snapshot. Additionally, at step 729, after the snapshot is created, the operating system managing the source volume and/or a backup agent associated with the client device continues tracking incremental changes to the source volume but begins storing that incremental tracking information in the second incremental tracking data structure. Once the snapshot is created and the second incremental tracking data structure is ready to begin storing new incremental changes, the "lock" imposed on the source volume during the atomic operation 720 is released, and the system can allow writes to the source volume again. That is, after the snapshot is created in step 729, any modifications to the source volume (i.e., writes that change blocks on the source volume) are no longer stored in the primary incremental tracking data structure, but are instead stored in the secondary incremental tracking data structure.

Continuing onto step 730, the operating system managing the source volume transitions into COW mode. As discussed above, when in COW mode, the operating system intercepts every write instruction to the source volume before the write occurs. The operating system then determines, for every write, whether the write would (if allowed to proceed) modify a block of the source volume that has not yet been copied to the target volume. If the to-be-modified block has already been copied to the target volume, the operating system can allow the write to proceed. If the to-be-modified block has not yet been copied to the target volume, the operating system can copy the original, un-modified contents of the to-be-modified block to the COW file, thereby preserving the original state of the to-be-modified block. After the original contents of the to-be-modified block have been safely copied to the COW file, the operating system can then allow the write instruction to modify the block.

Thus, the COW file that forms part of the snapshot volume (initialized in step 729) is filled with changed blocks (and only the changed blocks) based on the incremental tracking information stored in the primary incremental tracking data structure, rather than performing a copy-on-write operation for every write instruction regardless of the incremental tracking information. In other words, the only writes that are copied-on-write to the COW file are ones that the system needs to read into a target backup volume (i.e., the writes which modify blocks of the source volume that the incremental tracking information indicates have changed since the last backup). In this manner, the snapshot volume created in step 729 becomes a representation of the state of the source volume at a specific point in time. More specifically, the snapshot created in step 729 becomes a representation of the state of the source volume (or the state of a portion of the source volume) immediately prior to the atomic operation 720.

At step 732, while still in COW mode and while the operating system managing the source volume is still performing incremental tracking (with tracking information being stored in the secondary incremental tracking data structure), the operating system and/or the backup agent associated with the client device then copies the data off of the snapshot virtual device that was created in step 729 to a target volume. In particular embodiments, the target volume may be on the same device as the source volume (for example, on the same client computer or computer device, such as two partitions of a single hard drive or on two different hard drives on the same device) or may be on a different device (for example two different server blades or two different servers in the same location or at different locations connected via a communications network). By the end of step 732, the target volume contains a crash-consistent incremental copy of the source volume (or a portion thereof).

Once the backup from the snapshot virtual device is completed in step 732, the operating system exits COW mode and transitions into an incremental tracking only mode in step 734. In this mode, the operating system managing the source volume continues to store incremental tracking information associated with the source volume in the second incremental tracking data structure. Additionally, the incremental tracking information stored in the primary incremental tracking data structure is no longer needed because the necessary data has been backed-up. Therefore, in step 734, the previous incremental tracking information can be discarded. Then, the secondary incremental tracking data structure that has been storing incremental tracking information since step 729 becomes the primary tracking data structure/buffer for the purposes of the next backup process 600.

After step 734, the incremental backup process 700 may repeat by returning to allowing general computer use (e.g., step 706) and looping through these steps again as illustrated in FIGS. 7A and 7B.

As discussed above, because the system knows ahead of time exactly which blocks are going to need to be read from during each pass through the incremental backup process (i.e., by virtue of the incremental tracking data), the backup system can calculate the optimal size of the COW file in advance based on the maximum number of blocks that can possibly need to be read while in COW mode. Thus, the process 700 allows the accurate determination of the maximum COW space (i.e., file size) required for a particular incremental backup and the minimum the number of writes needed to fill the COW file during the backup. By accurately determining the amount of space that is needed for a particular backup instance in accordance with the present disclosure, the risk of a copying procedure failing can be reduced and/or eliminated.

Figure 8:
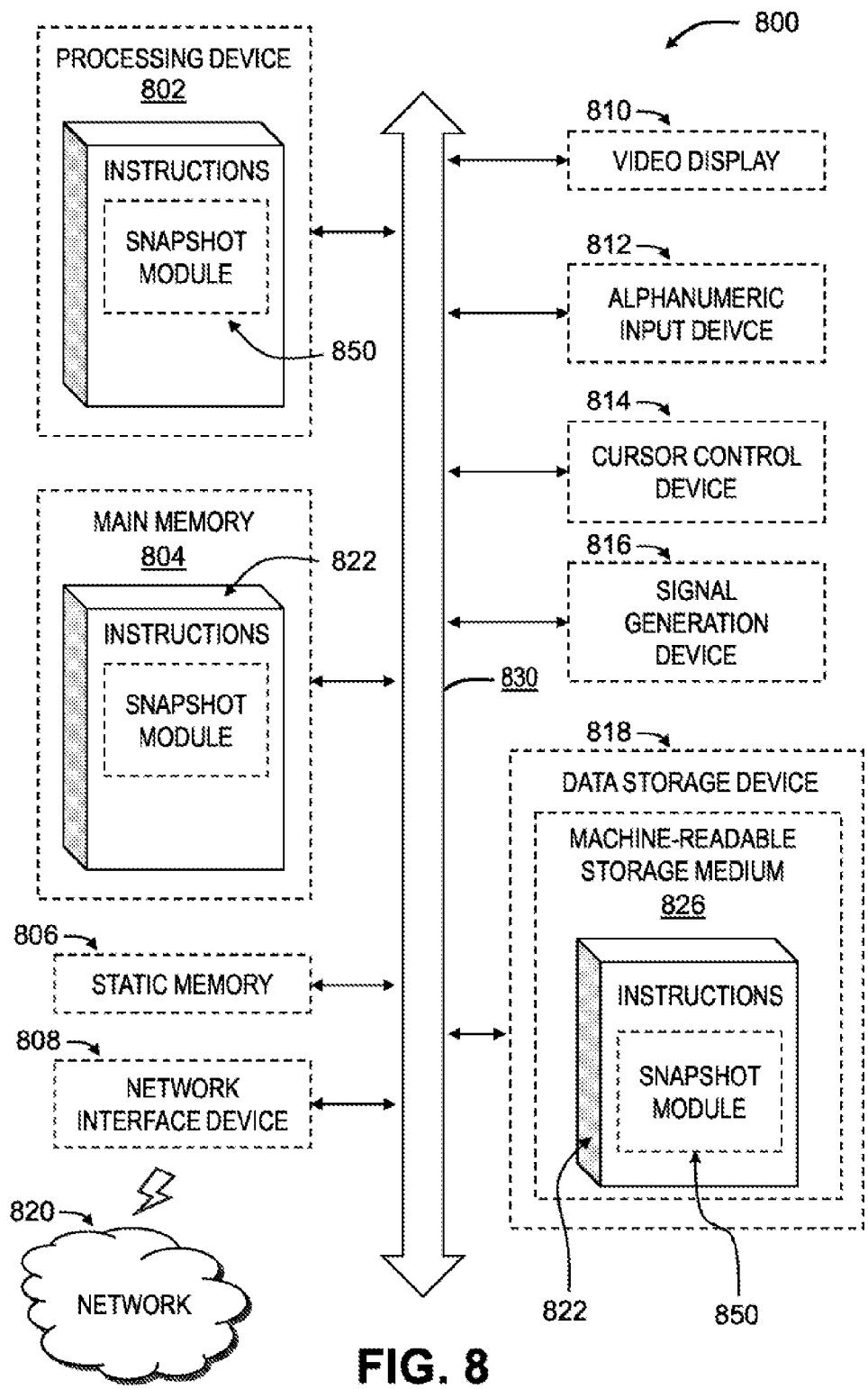
FIG. 8 is a diagram illustrating an example system within which a set of instructions for causing the system to perform any one or more of the methodologies discussed herein, may be executed in accordance with certain aspects of the present disclosure.

Turning to FIG. 8, an example machine of a computer system 800 is illustrated within which a set of instructions for causing the machine to perform any one or more of the methodologies discussed herein, may be executed. For example, client devices (e.g., 103, 104, 203, 204), backup aggregators (e.g., 102), master server 110, 210, and/or storage servers (e.g., 111A-D, 211A-D) may be implemented on machines similar to computer system 800. According to various embodiments, the machine may be connected (e.g., networked) to other machines in a LAN, an intranet, an extranet, and/or the Internet. The machine may operate in the capacity of a server (e.g., master server 110) or a client machine (e.g., client devices 103, 104, 203, 204 or backup aggregators 102) in a client-server network environment, or as a peer machine in a peer-to-peer (or distributed) network environment (e.g., storage servers 111A-D, 211A-D).

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or rambus DRAM (RDRAM), etc.), a static memory 806 (e.g., flash memory, static random access memory (SRAM), etc.), a network interface device 808 (operatively connecting the system 800 to a network 820), and a data storage device 818, which communicate with each other via a bus 830.

Processing device 802 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, a graphical processing unit (GPU), or the like. The processing device 802 is configured to execute instructions 822 for performing the operations and steps discussed herein.

The computing system 800 may further include a network interface device 808. The computing system 800 also may optionally include a video display unit 810 (e.g., a liquid crystal display (LCD), Light Emitting Diode (LED) monitor, or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions 822 or software embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a snapshot module 850, and/or a software library containing methods that can be called by the snapshot module 850. The instructions in the snapshot module 850 and/or the software library may be used to implement processes 400, 500, 600, 700 as described above. While the machine-readable storage medium 826 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulation of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "encoding" or "performing" or "dividing" or "setting" or "adding" or "locating" or "copying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Disclosed herein are exemplary embodiments including, but not limited to, the following:

A method for copying a source volume associated with a client device and comprising multiple blocks to a target volume, the method comprising: (a) taking a first snapshot of the source volume, the first snapshot comprising at least one block of the source volume to be copied to the target volume; (b) performing a first backup of the source volume based on at least a used block map; (c) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup; (d) while in incremental tracking mode, causing the operating system to allow writes to the source volume; (e) receiving an instruction to perform an incremental backup of the source volume to the target volume; (f) optionally storing the incremental tracking information in a memory associated with the client device; (g) determining a size of a COW file by multiplying the number of blocks identified by the incremental tracking information by a block size; (h) allocating, via the operating system, space on a storage media associated with the client device for the COW file, wherein the amount of space allocated for the COW file is based on the determined size; (i) initializing, via the operating system, a second incremental tracking data structure; (j) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup; (k) instructing the operating system to begin storing incremental tracking information for any blocks of the source volume modified since creating the snapshot virtual device of the source volume in the second incremental tracking data structure; (l) causing the operating system managing the source volume to enter a copy-on-write mode, wherein for each block of the source volume that is targeted by a write instruction from the operating system, the operating system: (l1) determines whether each targeted block is identified in the incremental tracking information of the first incremental tracking data structure as having been modified since the previous backup; and (l2) if a targeted block is identified in the incremental tracking information of the first incremental tracking data structure as having been modified since the previous backup, copying the contents of the targeted block to the COW file before the write instruction modifies the contents of the targeted block included in the source volume; (m) while the operating system remains in COW mode, performing an incremental backup of the source volume by copying the contents of the snapshot virtual device to the target volume; and (n) causing the operating system to exit COW mode and transition to incremental tracking mode only.

The method as described above, wherein the method further comprises: (o) discarding the first incremental tracking data structure; and (p) instructing the operating system to continue collecting and storing incremental tracking information in the second incremental tracking data structure.

The method as described above, wherein the method further comprises: (q) repeating steps (d) through (p).

The method as described above, wherein the operating system refrains from entering COW mode during one or more steps of the method.

In some embodiments, the target volume may be a storage server located at a cloud storage center remote from the client device.

In some embodiments, the target volume may be a backup aggregator located at a site local to the client device.

In some embodiments, performing the incremental backup of the source volume by copying the contents of the snapshot virtual device may bring the target volume into a crash-consistent state consistent with a state of the source volume at a single point in time associated with the time the copy-on-write mode was entered by the operating system.

In some embodiments, performing the first backup of the source volume based on the used block map may include causing the operating system managing the source volume to enter copy-on-write mode.

In some embodiments, the amount of space allocated for the COW file may be from about 80% to about 150% of the COW file size calculated in step (g).

A method for copying a source volume associated with a client device and comprising multiple blocks to a target volume, the method comprising: (a) designating a set of one or more blocks to be copied from the source volume to the target volume; (b) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup; (c) while in incremental tracking mode, causing the operating system to allow writes to the source volume; (d) copying the designated set of one or more blocks from the source volume to the target volume while the operating system is configured to write to the source volume; (e) identifying blocks of the source volume that were written to by the operating system since the operating system was configured to collect and store incremental tracking information in step (b); (f) if one or more blocks were identified in step (e), comparing an aggregate size of the identified one or more blocks to a threshold, wherein: (f1) if the aggregate size is greater than or equal to the threshold: changing the designated set of one or more blocks to be copied from the source volume to the target volume to include only one or more of the identified one or more blocks; resetting the incremental tracking information; and repeating steps (c), (d), and (e); (f2) if the aggregate size is below the threshold: causing the operating system to perform an incremental backup of the source volume to the target volume is performed, wherein the operating system managing the source volume enters a copy-on-write mode.

The method as described above, wherein performing the incremental backup of the source volume comprises: (g) optionally storing the incremental tracking information in a memory associated with the client device; (h) determining a size of a COW file by multiplying the number of blocks identified by the incremental tracking information by a block size; (i) allocating, via the operating system, space on a storage media associated with the client device for the COW file, wherein the amount of space allocated for the COW file is based on the determined size; (j) initializing, via the operating system, a second incremental tracking data structure; (k) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup; (l) instructing the operating system to begin storing incremental tracking information for any blocks of the source volume modified since creating the snapshot virtual device of the source volume in the second incremental tracking data structure; (m) causing the operating system managing the source volume to enter a copy-on-write mode, wherein for each block of the source volume that is targeted by a write instruction from the operating system, the operating system: (m1) determines whether each targeted block is identified in the incremental tracking information of the first incremental tracking data structure as having been modified since the previous backup; and (m2) if a targeted block is identified in the incremental tracking information of the first incremental tracking data structure as having been modified since the previous backup, copying the contents of the targeted block to the COW file before the write instruction modifies the contents of the targeted block included in the source volume; (n) while the operating system remains in COW mode, performing an incremental backup of the source volume by copying the contents of the snapshot virtual device to the target volume; and (o) causing the operating system to exit COW mode and transition to incremental tracking mode only.

The method as described above, wherein the method further comprises: (p) discarding the first incremental tracking data structure; and (q) instructing the operating system to continue collecting and storing incremental tracking information in the second incremental tracking data structure.

The method according as described above, wherein the method further comprises: (r) repeating steps (c) through (q).

The method as described above, wherein the operating system refrains from entering COW mode during steps (a) through (f).

In some embodiments, at least one of the first incremental tracking data structure and the second incremental tracking data structure may be a bitmap.

In some embodiments, the target volume may be a storage server located at a cloud storage center remote from the client device.

In some embodiments, the target volume may be a backup aggregator located at a site local to the client device.

In some embodiments, performing the incremental backup of the source volume by copying the contents of the snapshot virtual device may bring the target volume into a crash-consistent state consistent with a state of the source volume at a single point in time associated with the time the copy-on-write mode was entered by the operating system.

In some embodiments, designating the set of one or more blocks to be copied from the source volume to the target volume in step (a) may comprise designating at least one of (a1) all allocated blocks in the source volume, and (a2) all blocks in the source volume.

In some embodiments, the method may further comprise designating a set of excluded blocks in the source volume, wherein the designating the set of one or more blocks to be copied from the source volume to the target volume in step (a) comprises excluding the excluded blocks from the designated set of one or more blocks to be copied from the source volume to the target volume.

In some embodiments, the threshold may be determined based on a pre-defined proportion of a total size of at least one of the source volume and the target volume.

In some embodiments, the aggregate size of the identified one or more blocks may be a numerical count of the identified one or more blocks, and the threshold comprises a number of blocks.

In some embodiments, the amount of space allocated for the COW file may be from about 100% to about 150% of the COW file size calculated in step (h).

A system for copying a source volume associated with a client device and comprising multiple blocks to a target volume, the system comprising: at least one processor; and memory including instructions that, when executed by the at least one processor, cause the system to perform the steps of: (a) taking a first snapshot of the source volume, the first snapshot comprising at least one block of the source volume to be copied to the target volume; (b) performing a first backup of the source volume based on at least a used block map; (c) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup; (d) while in incremental tracking mode, causing the operating system to allow writes to the source volume; (e) receiving an instruction to perform an incremental backup of the source volume to the target volume; (f) optionally storing the incremental tracking information in a memory associated with the client device; (g) determining a size of a COW file by multiplying the number of blocks identified by the incremental tracking information by a block size; (h) allocating, via the operating system, space on a storage media associated with the client device for the COW file, wherein the amount of space allocated for the COW file is based on the determined size; (i) initializing, via the operating system, a second incremental tracking data structure; (j) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup; (k) instructing the operating system to begin storing incremental tracking information for any blocks of the source volume modified since creating the snapshot virtual device of the source volume in the second incremental tracking data structure; (l) causing the operating system managing the source volume to enter a copy-on-write mode, wherein for each block of the source volume that is targeted by a write instruction from the operating system, the operating system: (l1) determines whether each targeted block is identified in the incremental tracking information of the first incremental tracking data structure as having been modified since the previous backup; and (l2) if a targeted block is identified in the incremental tracking information of the first incremental tracking data structure as having been modified since the previous backup, copying the contents of the targeted block to the COW file before the write instruction modifies the contents of the targeted block included in the source volume; (m) while the operating system remains in COW mode, performing an incremental backup of the source volume by copying the contents of the snapshot virtual device to the target volume; (n) causing the operating system to exit COW mode and transition to incremental tracking mode only; (o) discarding the first incremental tracking data structure; (p) instructing the operating system to continue collecting and storing incremental tracking information in the second incremental tracking data structure; and (q) repeating steps (d) through (p).

The system as described above, wherein the target volume is a storage server located at a cloud storage center remote from the client device.

In some embodimentss, the target volume may be a backup aggregator located at a site local to the client device.

A system for copying a source volume associated with a client device and comprising multiple blocks to a target volume, the system comprising: at least one processor; and memory including instructions that, when executed by the at least one processor, cause the system to perform the steps of: (a) designating a set of one or more blocks to be copied from the source volume to the target volume; (b) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup; (c) while in incremental tracking mode, causing the operating system to allow writes to the source volume; (d) copying the designated set of one or more blocks from the source volume to the target volume while the operating system is configured to write to the source volume; (e) identifying blocks of the source volume that were written to by the operating system since the operating system was configured to collect and store incremental tracking information in step (b); (f) if one or more blocks were identified in step (e), comparing an aggregate size of the identified one or more blocks to a threshold, wherein: (f1) if the aggregate size is greater than or equal to the threshold: changing the designated set of one or more blocks to be copied from the source volume to the target volume to include only one or more of the identified one or more blocks; resetting the incremental tracking information; and repeating steps (c), (d), and (e); (f2) if the aggregate size is below the threshold: causing the operating system to perform an incremental backup of the source volume to the target volume is performed, wherein the operating system managing the source volume enters a copy-on-write mode; (g) optionally storing the incremental tracking information in a memory associated with the client device; (h) determining a size of a COW file by multiplying the number of blocks identified by the incremental tracking information by a block size; (i) allocating, via the operating system, space on a storage media associated with the client device for the COW file, wherein the amount of space allocated for the COW file is based on the determined size; (j) initializing, via the operating system, a second incremental tracking data structure; (k) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup; (l) instructing the operating system to begin storing incremental tracking information for any blocks of the source volume modified since creating the snapshot virtual device of the source volume in the second incremental tracking data structure; (m) causing the operating system managing the source volume to enter a copy-on-write mode, wherein for each block of the source volume that is targeted by a write instruction from the operating system, the operating system: (m1) determines whether each targeted block is identified in the incremental tracking information of the first incremental tracking data structure as having been modified since the previous backup; and (m2) if a targeted block is identified in the incremental tracking information of the first incremental tracking data structure as having been modified since the previous backup, copying the contents of the targeted block to the COW file before the write instruction modifies the contents of the targeted block included in the source volume; (n) while the operating system remains in COW mode, performing an incremental backup of the source volume by copying the contents of the snapshot virtual device to the target volume; (o) causing the operating system to exit COW mode and transition to incremental tracking mode only; (p) discarding the first incremental tracking data structure; (q) instructing the operating system to continue collecting and storing incremental tracking information in the second incremental tracking data structure; and (r) repeating steps (c) through (q).

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for copying a source volume associated with a client device and comprising multiple blocks to a target volume, the method comprising:
(a) taking a first snapshot of the source volume, the first snapshot comprising at least one block of the source volume to be copied to the target volume;
(b) performing a first backup of the source volume based on at least a used block map;
(c) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup;
(d) while in incremental tracking mode, causing the operating system to allow writes to the source volume;
(e) receiving an instruction to perform an incremental backup of the source volume to the target volume;
(f) optionally storing the incremental tracking information in a memory associated with the client device;
(g) determining a size of a COW file by multiplying the number of blocks identified by the incremental tracking information by a block size;
(h) allocating, via the operating system, space on a storage media associated with the client device for the COW file, wherein the amount of space allocated for the COW file is based on the determined size;
(i) initializing, via the operating system, a second incremental tracking data structure;
(j) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup;
(k) instructing the operating system to begin storing incremental tracking information for any blocks of the source volume modified since creating the snapshot virtual device of the source volume in the second incremental tracking data structure;
(l) causing the operating system managing the source volume to enter a copy-on-write mode, wherein for each block of the source volume that is targeted by a write instruction from the operating system, the operating system:

(l1) determines whether each targeted block is identified in the incremental tracking information of the first incremental tracking data structure as having been modified since the previous backup; and (l2) if a targeted block is identified in the incremental tracking information of the first incremental tracking data structure as having been modified since the previous backup, copying the contents of the targeted block to the COW file before the write instruction modifies the contents of the targeted block included in the source volume;

(m) while the operating system remains in COW mode, performing an incremental backup of the source volume by copying the contents of the snapshot virtual device to the target volume; and (n) causing the operating system to exit COW mode and transition to incremental tracking mode only.

2. The method of claim 1, wherein the method further comprises:

(o) discarding the first incremental tracking data structure; and (p) instructing the operating system to continue collecting and storing incremental tracking information in the second incremental tracking data structure.

3. The method of claim 2, wherein the method further comprises:

(q) repeating steps (d) through (p).

4. The method of claim 3, wherein the operating system refrains from entering COW mode during one or more steps of the method.

5. The method of claim 1, wherein performing the incremental backup of the source volume by copying the contents of the snapshot virtual device brings the target volume into a crash-consistent state consistent with a state of the source volume at a single point in time associated with the time the copy-on-write mode was entered by the operating system.

6. A method for copying a source volume associated with a client device and comprising multiple blocks to a target volume, the method comprising:

(a) designating a set of one or more blocks to be copied from the source volume to the target volume;

(b) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup;

(c) while in incremental tracking mode, causing the operating system to allow writes to the source volume;

(d) copying the designated set of one or more blocks from the source volume to the target volume while the operating system is configured to write to the source volume;

(e) identifying blocks of the source volume that were written to by the operating system since the operating system was configured to collect and store incremental tracking information in step (b);

(f) if one or more blocks were identified in step (e), comparing an aggregate size of the identified one or more blocks to a threshold, wherein:

(f1) if the aggregate size is greater than or equal to the threshold:
changing the designated set of one or more blocks to be copied from the source volume to the target volume to include only one or more of the identified one or more blocks;
resetting the incremental tracking information; and
repeating steps (c), (d), and (e);

(f2) if the aggregate size is below the threshold:
causing the operating system to perform an incremental backup of the source volume to the target volume is performed, wherein the operating system managing the source volume enters a copy-on-write mode.

7. The method of claim 6, wherein performing the incremental backup of the source volume comprises:

(g) optionally storing the incremental tracking information in a memory associated with the client device;

(h) determining a size of a COW file by multiplying the number of blocks identified by the incremental tracking information by a block size;

(i) allocating, via the operating system, space on a storage media associated with the client device for the COW file, wherein the amount of space allocated for the COW file is based on the determined size;

(j) initializing, via the operating system, a second incremental tracking data structure;

(k) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup;

(l) instructing the operating system to begin storing incremental tracking information for any blocks of the source volume modified since creating the snapshot virtual device of the source volume in the second incremental tracking data structure;

(m) causing the operating system managing the source volume to enter a copy-on-write mode, wherein for each block of the source volume that is targeted by a write instruction from the operating system, the operating system:

(m1) determines whether each targeted block is identified in the incremental tracking information of the first incremental tracking data structure as having been modified since the previous backup; and (m2) if a targeted block is identified in the incremental tracking information of the first incremental tracking data structure as having been modified since the previous backup, copying the contents of the targeted block to the COW file before the write instruction modifies the contents of the targeted block included in the source volume;

(n) while the operating system remains in COW mode, performing an incremental backup of the source volume by copying the contents of the snapshot virtual device to the target volume; and (o) causing the operating system to exit COW mode and transition to incremental tracking mode only.

8. The method of claim 7, wherein the method further comprises:

(p) discarding the first incremental tracking data structure; and (q) instructing the operating system to continue collecting and storing incremental tracking information in the second incremental tracking data structure.

9. The method of claim 8, wherein the method further comprises:

(r) repeating steps (c) through (q).

10. The method of claim 9, wherein the operating system refrains from entering COW mode during steps (a) through (f).

11. The method of claim 6, wherein at least one of the first incremental tracking data structure and the second incremental tracking data structure is a bitmap.

12. The method of claim 6, wherein the target volume is a storage server located at a cloud storage center remote from the client device.

13. The method of claim 6, wherein the target volume is a backup aggregator located at a site local to the client device.

14. The method of claim 6, wherein performing the incremental backup of the source volume by copying the contents of the snapshot virtual device brings the target volume into a crash-consistent state consistent with a state of the source volume at a single point in time associated with the time the copy-on-write mode was entered by the operating system.

15. The method of claim 6, wherein designating the set of one or more blocks to be copied from the source volume to the target volume in step (a) comprises designating at least one of (a1) all allocated blocks in the source volume, and (a2) all blocks in the source volume.

16. The method of claim 6, further comprising designating a set of excluded blocks in the source volume, wherein the designating the set of one or more blocks to be copied from the source volume to the target volume in step (a) comprises excluding the excluded blocks from the designated set of one or more blocks to be copied from the source volume to the target volume.

17. The method of claim 6, wherein the threshold is determined based on a pre-defined proportion of a total size of at least one of the source volume and the target volume.

18. The method of claim 6, wherein the aggregate size of the identified one or more blocks is a numerical count of the identified one or more blocks, and the threshold comprises a number of blocks.

19. The method of claim 7, wherein the amount of space allocated for the COW file is from about 100% to about 150% of the COW file size calculated in step (h).

20. A system for copying a source volume associated with a client device and comprising multiple blocks to a target volume, the system comprising:
at least one processor; and
memory including instructions that, when executed by the at least one processor, cause the system to perform the steps of:
(a) designating a set of one or more blocks to be copied from the source volume to the target volume;
(b) causing an operating system managing the source volume to enter an incremental tracking mode, wherein the operating system collects incremental tracking information for any blocks of the source volume modified while in incremental tracking mode and stores the incremental tracking information in a first incremental tracking data structure, the incremental tracking information comprising the number of blocks of the source volume modified since performing the first backup;
(c) while in incremental tracking mode, causing the operating system to allow writes to the source volume;
(d) copying the designated set of one or more blocks from the source volume to the target volume while the operating system is configured to write to the source volume;
(e) identifying blocks of the source volume that were written to by the operating system since the operating system was configured to collect and store incremental tracking information in step (b);
(f) if one or more blocks were identified in step (e), comparing an aggregate size of the identified one or more blocks to a threshold, wherein:
(f1) if the aggregate size is greater than or equal to the threshold:
changing the designated set of one or more blocks to be copied from the source volume to the target volume to include only one or more of the identified one or more blocks;
resetting the incremental tracking information; and
repeating steps (c), (d), and (e);
(f2) if the aggregate size is below the threshold:
causing the operating system to perform an incremental backup of the source volume to the target volume is performed, wherein the operating system managing the source volume enters a copy-on-write mode;
(g) optionally storing the incremental tracking information in a memory associated with the client device;
(h) determining a size of a COW file by multiplying the number of blocks identified by the incremental tracking information by a block size;
(i) allocating, via the operating system, space on a storage media associated with the client device for the COW file, wherein the amount of space allocated for the COW file is based on the determined size;
(j) initializing, via the operating system, a second incremental tracking data structure;
(k) creating a snapshot virtual device of the source volume, wherein the snapshot virtual device of the source volume is a logical volume comprising the COW file and the contents of the source volume that are not identified by the incremental tracking information of the first incremental tracking data structure as having been modified since a previous backup;
(l) instructing the operating system to begin storing incremental tracking information for any blocks of the source volume modified since creating the snapshot virtual device of the source volume in the second incremental tracking data structure;
(m) causing the operating system managing the source volume to enter a copy-on-write mode, wherein for each block of the source volume that is targeted by a write instruction from the operating system, the operating system:
(m1) determines whether each targeted block is identified in the incremental tracking information of the first incremental tracking data structure as having been modified since the previous backup; and
(m2) if a targeted block is identified in the incremental tracking information of the first incremental tracking data structure as having been modified since the previous backup, copying the contents of the targeted block to the COW file before the write instruction modifies the contents of the targeted block included in the source volume;
(n) while the operating system remains in COW mode, performing an incremental backup of the source volume by copying the contents of the snapshot virtual device to the target volume;

(o) causing the operating system to exit COW mode and transition to incremental tracking mode only;
(p) discarding the first incremental tracking data structure;
(q) instructing the operating system to continue collecting and storing incremental tracking information in the second incremental tracking data structure; and
(r) repeating steps (c) through (q).

\* \* \* \* \*

UNITED STATES PATENT AND TRADEMARK OFFICE
CERTIFICATE OF CORRECTION

| | | |
|---|---|---|
| PATENT NO. | : 11,531,488 B2 | Page 1 of 2 |
| APPLICATION NO. | : 17/170094 | |
| DATED | : December 20, 2022 | |
| INVENTOR(S) | : Hutcheson et al. | |

It is certified that error appears in the above-identified patent and that said Letters Patent is hereby corrected as shown below:

In the Specification
Column 7, Line 42, replace "According other embodiments," with -- According to other embodiments, --
Column 15, Line 7-8, replace "then the backup will fail and the process will have to be restarted." with -- then the backup will fail, and the process will have to be restarted. --
Column 17, Line 15, replace "then the backup will fail and an enriely different" with -- then the backup will fail, and an entirely different --
Column 23, Line 61, replace "then the backup will fail and the process" with -- then the backup will fail, and the process --
Column 31, Line 23, replace "The method accroding as described above," with -- The method as described above, --
Column 32, Line 63, replace "In some embodimentss," with -- In some embodiments, --

In the Claims
Column 34, Line 34, replace "the number of blocks" with -- a number of blocks --
Column 34, Line 47, replace "wherein the amount of space" with -- wherein an amount of space --
Column 34, Line 54, replace "and the contents of the source volume" with -- and contents of the source volume --
Column 35, Line 8-9, replace "copying the contents of the targeted block" with -- copying contents of the targeted block --
Column 35, Line 14, replace "copying the contents of the snapshot" with -- copying contents of the snapshot --
Column 35, Line 49, replace "the number of blocks" with -- a number of blocks --
Column 35, Line 50, replace "since performing the first backup" with -- since performing a first backup --
Column 36, Line 27, replace "the contents of the source volume" with -- contents of the source volume --
Column 36, Line 48-49, replace "copying the contents of the targeted block" with -- copying contents of the targeted block --
Column 36, Line 54, replace "copying the contents of the snapshot" with -- copying contents of the Signed and Sealed this
Fourth Day of April, 2023

*Katherine Kelly Vidal*

Katherine Kelly Vidal
*Director of the United States Patent and Trademark Office*

CERTIFICATE OF CORRECTION (continued)
U.S. Pat. No. 11,531,488 B2 snapshot --
Column 37, Line 5-6, replace "and the second incremental" with -- and a second incremental --
Column 37, Line 15, replace "the snapshot virtual device" with -- a snapshot virtual device --
Column 37, Line 60, replace "forming the first backup;" with -- forming a first backup; --
Column 38, Line 31, replace "wherein the amount of space" with -- wherein an amount of space --
Column 38, Line 38, replace "and the contents of the source volume" with -- and contents of the source volume --
Column 38, Line 60-61, replace "copying the contents of the targed block" with -- copying contents of the targeted block --
Column 38, Line 66, replace "copying the contents of the snapshot" with -- copying contents of the snapshot --